US005367271A

United States Patent [19]
Yamamoto et al.

[11] Patent Number: 5,367,271
[45] Date of Patent: Nov. 22, 1994

[54] QUADRATURE MODULATOR HAVING PHASE SHIFT AND AMPLITUDE COMPENSATION CIRCUITS

[75] Inventors: Kazuya Yamamoto; Kousei Maemura, both of Itami, Japan

[73] Assignee: Mitsubishi Denki Kabushiki Kaisha, Tokyo, Japan

[21] Appl. No.: 130,551

[22] Filed: Oct. 1, 1993

[30] Foreign Application Priority Data

Feb. 3, 1993 [JP] Japan .................................. 5-016125

[51] Int. Cl.$^5$ ............................................ H04L 27/36
[52] U.S. Cl. ..................................... 332/105; 375/39; 375/52; 375/57; 375/67
[58] Field of Search ............... 332/103, 104, 105, 151, 332/152, 167, 168; 375/39, 52, 57, 67; 455/46, 109

[56] References Cited

U.S. PATENT DOCUMENTS 5,119,399 6/1992 Santos et al. .................. 332/103 X
5,293,406 3/1994 Suzuki ............................ 332/107 X

FOREIGN PATENT DOCUMENTS 55-87036 12/1980 Japan .

OTHER PUBLICATIONS

Yamamoto et al., "A 1.9 GHz-Band GaAs Direct-Quadrature Modulator IC With A Phase Shifter", GaAs IC Symposium, Oct. 1992, pp. 37-40.
Altes, "Monolithic RC All-Pass Networks With Constant-Phase-Difference Outputs", IEEE Transactions on Microwave Theory and Techniques, vol. MTT-34, No. 12, Dec. 1986, pp. 1533–1537.

Primary Examiner—Siegfried H. Grimm
Attorney, Agent, or Firm—Leydig, Voit & Mayer

[57] ABSTRACT

A quadrature modulator includes a 0°/90° phase shifter including only resistors, capacitors, and transistors that separates an input carrier wave into two carrier waves having a phase difference of 90° from each other by differentiating and integrating. The quadrature modulator includes amplitude compensating circuits for converting the two carrier waves from sinusoidal waveforms to rectangular waveforms having predetermined amplitudes. The amplitude compensating circuits are inserted between the phase shifter and double-balanced mixers. The phase shifter consists of circuit elements appropriate for circuit integration and produces a high degree of orthogonality in its output signals as a function of variations in the characteristic values of the circuit elements. Complementary carriers having precise orthogonality as well as superior balance are input to double-balanced mixers. Accordingly, a superior modulation wave having fewer spurious components is obtained easily with simplified circuit integration.

24 Claims, 15 Drawing Sheets

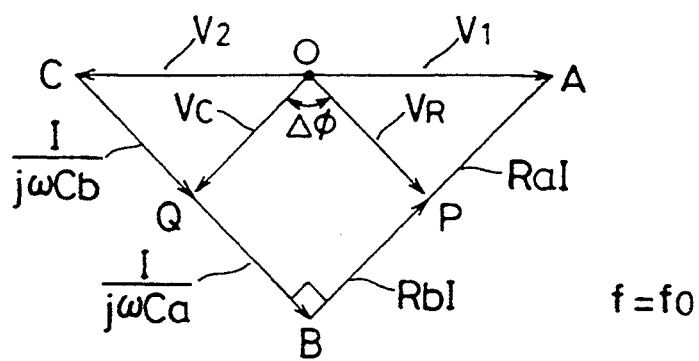
Fig.9(a)
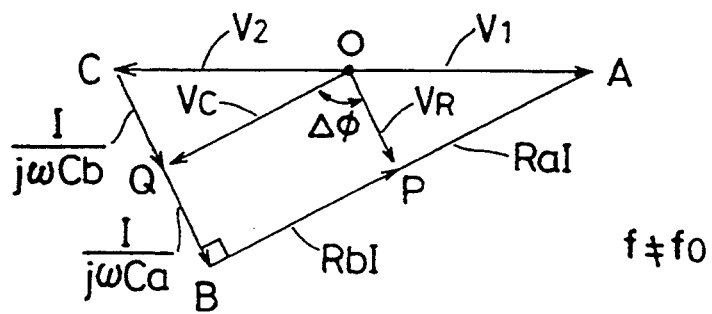
Fig.9(b)
Fig.10
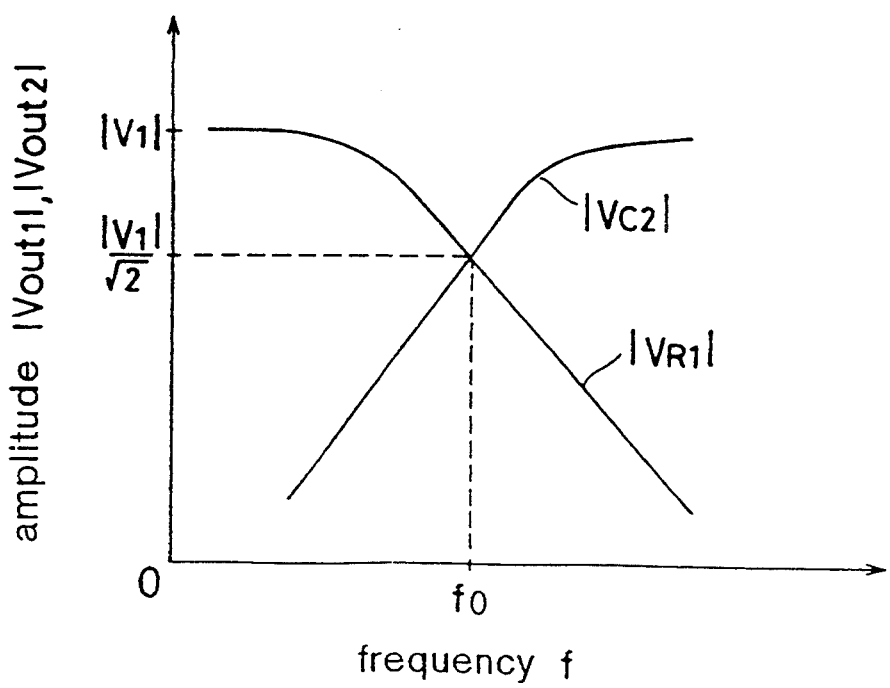

$f = f_0$

Fig.17 (a) (Prior Art)
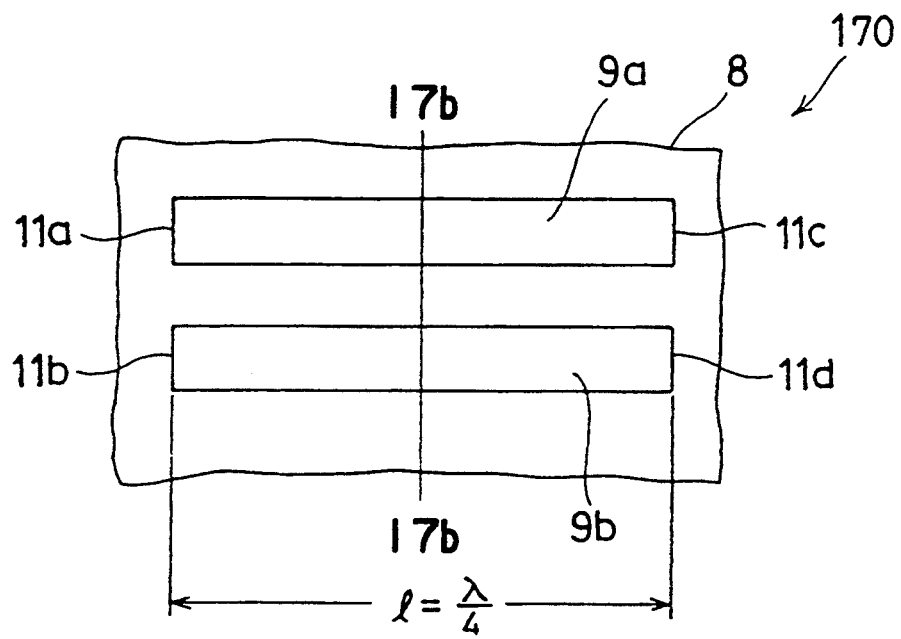
Fig.17 (b) (Prior Art)
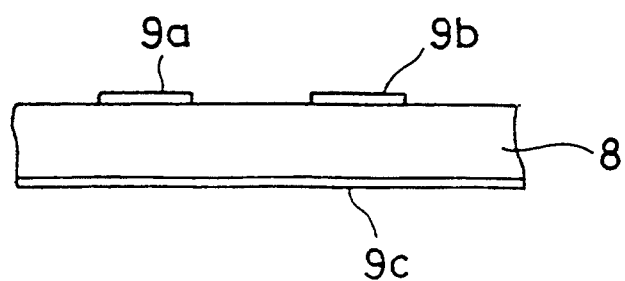

Fig. 18 (a) (Prior Art)
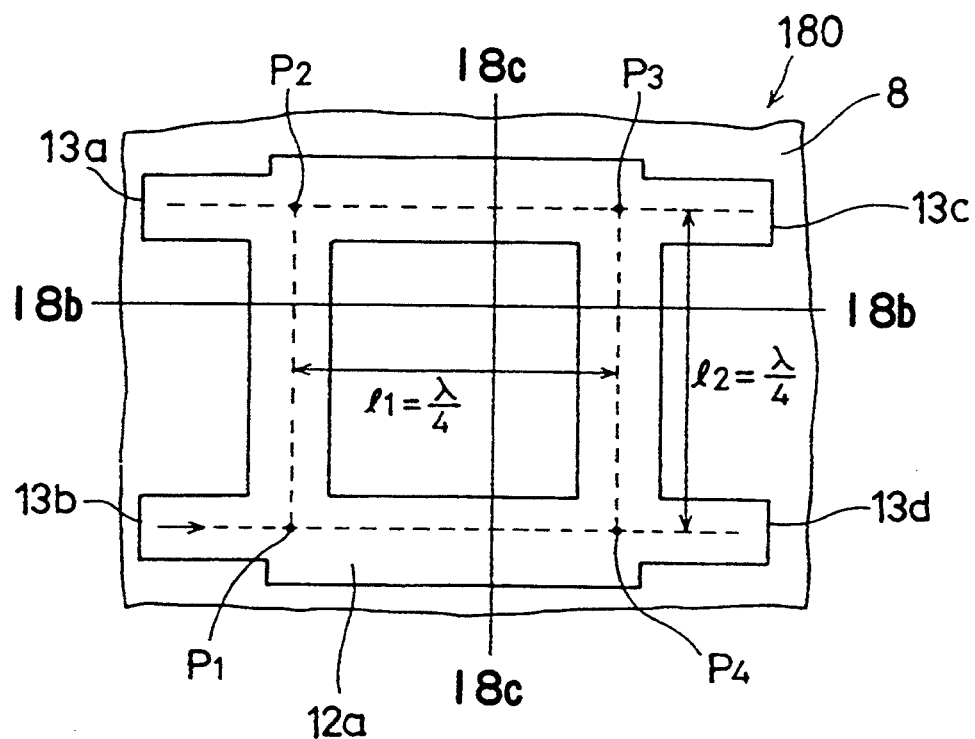
Fig. 18 (b) (Prior Art)
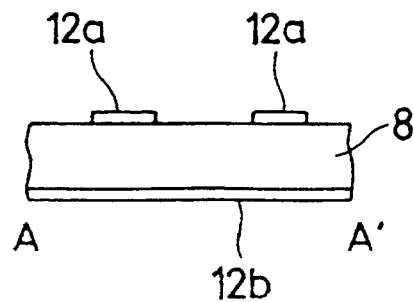
Fig. 18 (c) (Prior Art)
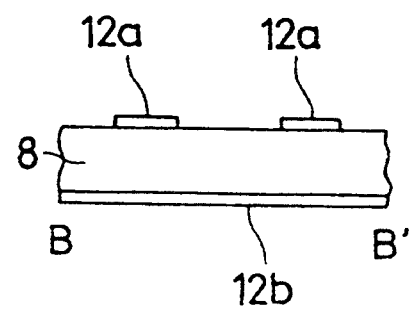

Fig.21 (Prior Art)
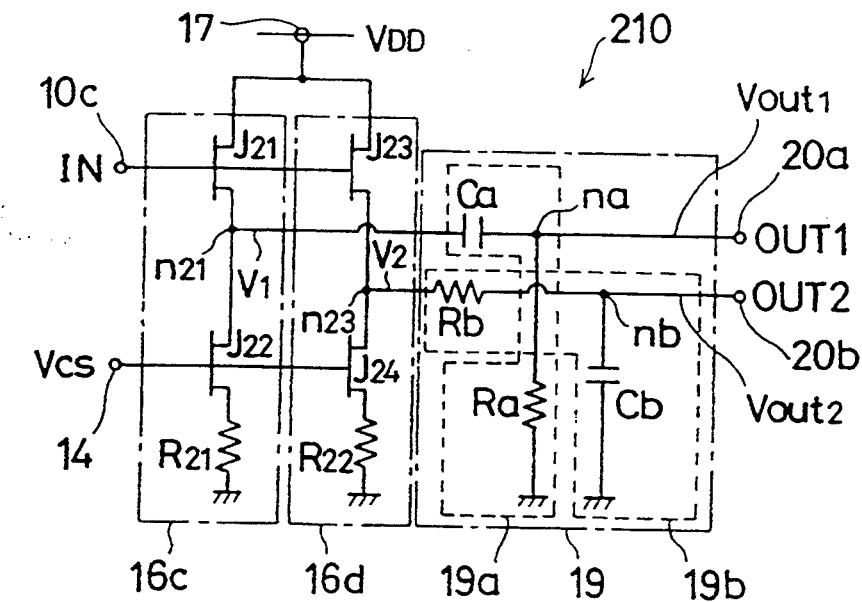
Fig.22 (a) (Prior Art)
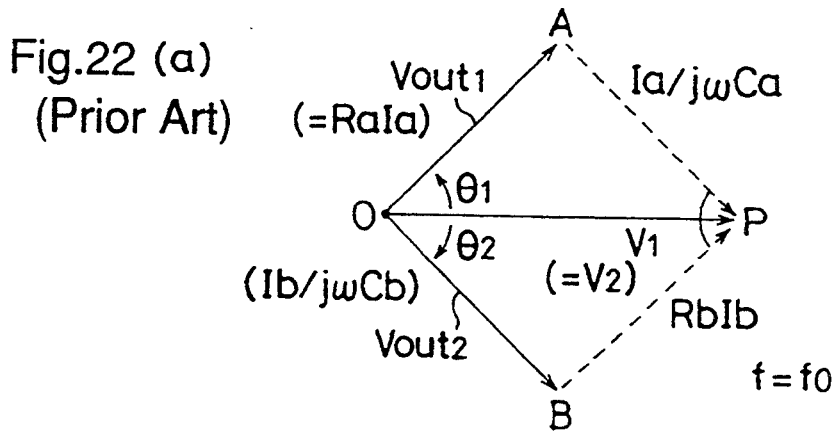
Fig.22 (b) (Prior Art)
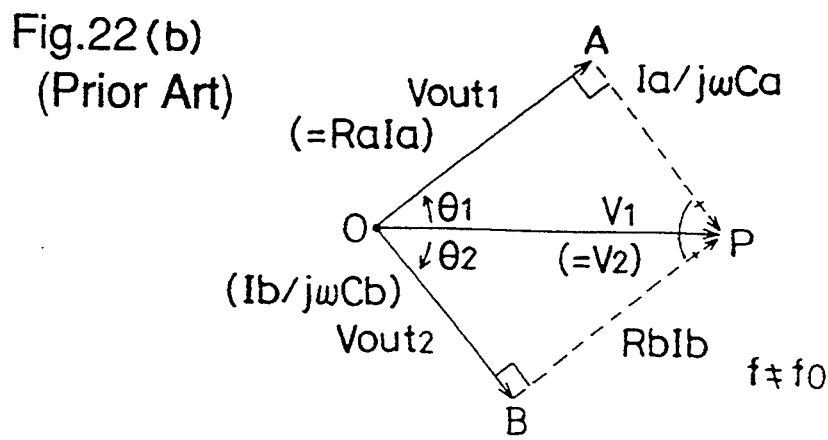

QUADRATURE MODULATOR HAVING PHASE SHIFT AND AMPLITUDE COMPENSATION CIRCUITS

FIELD OF THE INVENTION

The present invention relates to a quadrature modulator utilized for digital mobile communication system and, more particularly, to a quadrature modulator that is appropriate for circuit integration, and that can be constituted in a small-sized IC.

BACKGROUND OF THE INVENTION

In recent years, a digital modulation system has been practically used in a mobile communication system, and circuit integration of a quadrature modulator constituting a modulator section for performing multi-value digital modulation such as QPSK (Quaternary Phase Shift Keying) has been increasing in importance.

FIG. 15 is a block diagram illustrating a general construction of a prior art quadrature modulator. In the figure, reference numeral 150 designates a quadrature modulator. The quadrature modulator 150 includes a 0°/90° phase shifter 1 which, connected to a signal input terminal (IN) 10, separates an input carrier wave (hereinafter referred to simply as carrier) into two sinusoidal signals having a phase difference of 90° from each other, double-balanced mixers 2 and 3 performing modulation by mixing base band signals on the output carrier waves output from the 0°/90° phase shifter, and an in-phase synthesizer 4 which synthesizes modulated signals of the double-balanced mixers 2 and 3 and outputs the signals to an output terminal (OUT) 20. The double-balanced mixer 2 is for the I (In-phase) channel and the double-balanced mixer 3 is for the Q (Quadrature-phase) channel. A base band signal ($I_{BB}$) at the I-channel is input from a base band signal input terminal 5 and a base band signal ($Q_{BB}$) at the Q-channel is input from a base band signal input terminal 6.

In such a quadrature modulator, in order to realize superior modulation, it is necessary to obtain a modulated wave spectrum including fewer spurious components such as image components or carrier leakage. Thus, in order to sufficiently suppress the image component relative to the modulation signal component, the orthogonality of two carriers which are input to the two double-balanced mixers 2 and 3 is important, and the precision of orthogonality of the carriers in the 0°/90° phase shifter 1, i.e., how precisely the carrier is separated into two sinusoidal signals having a phase difference of 90° from each other, is important. In addition, amplitude errors in complementary carriers which are input to the respective double-balanced mixers 2 and 3 also cause spurious components such as image components or carrier leakage, and therefore, it is also important to decrease these amplitude errors so as to obtain a modulated wave spectrum including fewer spurious components. Consequently, in order to carry out circuit integration of a quadrature modulator which is superior in its modulation characteristics, how the complementary carriers which are superior in the balancing, i.e., which includes fewer amplitude errors are input to the double balanced mixers by including a 0°/90° phase shifter which is superior in the orthogonality of its output carriers and is appropriate for circuit integration, is important, and this determines the performance of the quadrature modulator integrated circuit and the yield thereof.

A description is given of an example and characteristics of a 0°/90° phase shifter which is conventionally proposed.

FIG. 16 shows a circuit diagram of a prior art 0°/90° phase shifter which is constructed with a high pass filter and a low pass filter each comprising inductors (L) and capacitors (C). In the figure, reference numeral 160 designates a 0°/90° phase shifter. This 0°/90° phase shifter 160 includes an in-phase power separating circuit 7a connected to a signal input terminal (IN) 10, and a low pass filter 7b and a high pass filter 7c which separates the output of the in-phase power separating circuit 7a to two output signals having a phase difference of 90° from each other and outputs those output signals to the signal output terminals (OUT1) 20a and (OUT2) 20b, respectively. The low pass filter 7b includes inductors L1 and L2 serially connected between the in-phase power separating circuit 7a and the output terminal 20a and a capacitor C3 connected between the node of two inductors L1 and L2 and the ground. The high pass filter 7c includes capacitors C1 and C2 serially connected between the in-phase power separating circuit 7a and the output terminal 20b and an inductor L3 connected between the node of two capacitors C1 and C2 and the ground.

In this 0°/90° phase shifter 160, it is possible to take out signals having a 90° phase difference from two signal output terminals 20a (OUT1) and 20b (OUT2) by selecting values of three inductors L1 to L3 and three capacitors C1 to C3 appropriately. While this 0°/90° phase shifter has low insertion loss or the like, when it is operable at a submicrowave band, for example, 800 MHz band, or in a 1.9 GHz band used in digital portable telephone or digital codeless telephone, its circuit integration and miniaturization are difficult due to the inductors L1 to L3 occupying a large area.

FIGS. 17(a) and 17(b) show a construction of a ¼ wavelength coupling directional coupler, where FIG. 17(a) is a top view thereof, and FIG. 17(b) is a sectional view thereof along line 17b—17b of FIG. 17(a). In the figure, reference numeral 170 designates a ¼ wavelength coupling directional coupler, which includes coupling line conductors 9a, 9b arranged on the top surface of a substrate 8 comprising alumina or the like and a ground conductor 9c arranged on the under surface of the substrate 8. These two coupling line conductors 9a, 9b and ground conductor 9c constitute microstrip lines. Reference numerals 11a to 11d in the figure designate input or output ports.

In this ¼ wavelength coupling directional coupler 170, when the three ports 11a, 11c, and 11d are terminated with 50Ω and the port 11b receives a driving source having an internal resistance 50Ω, no output signal appears at the port 11c and output signals having a 90° phase difference appear at the ports 11a, 11d, respectively. Consequently, this ¼ wavelength coupling directional coupler can be operated as a 0°/90° phase shifter. In this ¼ wavelength side coupling directional coupler 170, however, because coupling line conductors 9a, 9b are required to have a conductor length of ¼ wavelength, respectively, when it is operable at submicrowave band, for example, 800 MHz band, or in a 1.9 GHz band used in digital portable telephones or digital cordless telephones, conductor lengths of coupling line conductors 9a, 9b are longer and the grounded areas are increased, thereby resulting in difficulties in circuit integration and miniaturization.

FIG. 18(a) and 18(b) illustrates a construction of a ¼ wavelength branch line type directional coupler, where FIG. 18(a) is a top view thereof, FIG. 18(b) is a sectional view thereof along line 18b—18b of FIG. 18(a), and FIG. 18(c) is a sectional view along line 18c—18c of FIG. 18(a). In the figure, reference numeral 180 designates a ¼ wavelength branch line type directional coupler, which includes branch line conductor 12a arranged on the top surface of substrate 8 comprising alumina or the like and ground conductor 12b. These branch line conductor 12a and ground conductor 12b constitute microstrip lines. Reference numerals 13a to 13d designate input or output ports.

In this ¼ wavelength branch line type directional coupler, for example, when the three ports 13a, 13c and 13d are terminated with 50Ω and the port 13b receives a driving source of internal resistance 50Ω, no output signals appear at the port 13a and output signals having a 90° phase difference appear at the port 13c, 13d, respectively. Consequently, this ¼ wavelength branch line type directional coupler can be operated as a 0°/90° phase shifter. However, because conductor lengths P1 to P2, P2 to P3, P3 to P4 and P4 to P1 at the branch line conductor 12a are required to be ¼ wavelengths, when it is operable at submicrowave band such as 800 MHz band or in a 1.9 GHz band which are used in digital portable telephones or digital cordless telephones, the conductor lengths of the branch line conductors 12a are longer and the grounded area is larger, thereby resulting in difficulties in circuit integration and miniaturization, similarly to the ¼ wavelength side coupling directional coupler 170 illustrated in FIG. 17(a).

Contrary to the conventional 0°/90° phase shifters illustrated in FIGS. 16 to 18 which are not appropriate for circuit integration and miniaturization, there is a 90° phase shifter illustrated in FIG. 19 and FIG. 21 without inductors or ¼ wavelength lines, which is appropriate for circuit integration and which can be constituted by only resistors and capacitors, or by only resistors, capacitors and transistors, which require no wide chip areas, respectively.

FIG. 19 shows a circuit diagram illustrating an example of a 0°/90° phase shifter having such a circuit construction. In the figure, reference numeral 190 designates a 0°/90° phase shifter. This 0°/90° phase shifter includes a differential amplifier circuit 15 which is inserted between a power supply terminal ($V_{DD}$) 17 and the ground and to which the input carriers are input from a positive phase signal input terminal (IN1) 10a and a negative phase signal input terminal (IN2) 10b, two source followers 16a, 16b connected at the later stage of the differential amplifier circuit 15, and a signal separating circuit 18 of an all band pass type circuit which separates the outputs of these two source followers 16a, 16b into two carriers comprising sinusoidal signals having a 90° phase difference and outputs them to the output signal terminals (OUT1) 20a and (OUT2) 20b, respectively.

In the differential amplifier circuit 15, reference characters J11 to J13 designate FETs and reference characters R11 to R13 designate resistors. The gates of FETs J11, J12 are connected to positive phase signal input terminal (IN1) 10a and negative phase signal input terminal (IN2) 10b, respectively, the sources of FETs J11, J12 are connected to the drain of FET J13, and the drains of FETs J11, J12 are connected to power supply terminal $V_{DD}$ 17 via two resistors R11 and R12, respectively. The source of FET J13 is grounded via resistor R13, and the gate thereof is connected to a constant-current source bias terminal Vcs 14.

In the source follower 16a, reference characters J14, J15 designate FETs, reference character R14 designates a resistor, and the gate of FET J14 is connected to the connection node between resistor R11 and FET J11, the drain thereof is connected to power supply terminal $V_{DD}$ 17, and the source thereof is connected to the drain of FET J15. The source of FET J15 is grounded via resistor R14, and the gate thereof is connected to the constant-current source bias terminal Vcs 14.

In the source follower 16b, reference characters J16, J17 designate FETs, reference character R15 designates a resistor, and the gate of FET J16 is connected to the connection node between resistor R12 and FET J12, the drain thereof is connected to power supply terminal $V_{DD}$ 17, and the source thereof is connected to the drain of FET J17. The source of FET J17 is grounded via resistor R15, and the gate thereof is connected to the constant-current source bias terminal Vcs 14.

In the signal separating circuit 18, reference characters Ra, Rb designate resistors, and reference characters Ca, Cb designate capacitors. Resistor Ra and capacitor Ca, serially connected, and resistor Rb and capacitor Cb, serially connected, are connected in parallel with each other between the connection node n11 between FET J14 and FET J15 and the connection node n12 between FET J16 and FET J17.

The differential amplifier circuit 15 is provided as means for inputting signals of reverse phases to each other to the gates of FETs J14, J16 of source followers 16a, 16b, respectively. The input signals which are input to the positive phase signal input terminal (IN1) 10a and the negative phase signal input terminal (IN2) 10b, respectively, are not necessarily required to be of reverse phases. Either of the two signals can be a reference voltage.

Reference characters V1, V2 in the figure designate voltages at the connection node n11 between the FET J14 and the FET J15, and the connection node n12 between the FET J16 and the FET J17, respectively.

FIG. 20 is a diagram illustrating the voltage vector V1 at the connection node n11 between the FET J14 and the FET J15, the voltage vector V2 (= −V1) at the connection node n12 between the FET J16 and the FET J17, and output voltage vectors Vout1, Vout2, when the values of resistors Ra, Rb and capacitors Ca, Cb constituting the signal separating circuit in the 0°/90° phase shifter in FIG. 19 are selected so that the output voltages Vout1 and Vout2 are orthogonal to each other at the design frequency $f_0$. Reference characters Ia, Ib in the figure designate a current flowing through the connection node $n_a$ between resistor Ra and capacitor Ca, and a current flowing through the connection node $n_b$ between resistor Rb and capacitor Cb, respectively. In addition, this figure shows a vector diagram, when the angle Φ1 produced by the voltage vectors V1 and Ia/jωCa (j is the imaginary unit, ω is angular frequency) and the angle Φ2 produced by the voltage vectors V2 and RbIb are both set to 22.5°, ΔΦ in the figure represents a phase difference between the output voltages Vout1 and Vout2.

It is found from this figure that the amplitudes of the output voltages Vout1 and Vout2 are equal to the amplitudes of V1 and V2 over a wide band, because the signal separating circuit 18 is an all band pass type circuit. However, because the currents Ia and Ib generating the output voltages Vout1 and Vout2 of the signal separating circuit 18, respectively, are provided separately, the frequency band that can maintain a phase difference of 90° cannot be made so wide, and when there arise element variations in the resistors Ra and Rb and the capacitors Ca and Cb during circuit integration (i.e., when the values of the resistors Ra, Rb and the capacitors Ca, Cb fall outside the design values during manufacturing), it is impossible to separate signals exactly into signals of 0° and 90°, respectively, thereby resulting in low precision in orthogonality as a function of variations in element characteristics.

FIG. 21 shows a circuit diagram illustrating a 0°/90° phase shifter including a signal separating circuit comprising a differentiating circuit and an integrating circuit. In the figure, reference character 210 designates a 0°/90° phase shifter. This 0°/90° phase shifter 210 includes two source followers 16c and 16d to which the input carrier from a signal input terminal (IN) 10c is input and which are connected in parallel between power supply terminal $V_{DD}$ 17 and the ground, and a signal separating circuit 19 which separates the outputs of these two source followers 16c and 16d into two signals having a 90° phase difference, to output them to the signal output terminals (OUT1) 20a and (OUT2) 20b, respectively. This signal separating circuit 19 comprises the differentiating circuit 19a and the integrating circuit 19b. In the source follower 16c, reference characters J21 and J22 designate FETs, reference character R21 designate a resistor, the gate of the FET J21 is connected to the input terminal (IN) 10c, the drain thereof is connected to the power supply terminal $V_{DD}$ 17, and the source thereof is connected to the drain of the FET J22. The source of the FET J22 is grounded via the resistor R21, and the gate thereof is connected to the constant-current source bias terminal Vcs 14.

In the source follower 16d, reference characters J23 and J24 designate FETs, reference character R22 designate a resistor, and the gate of the FET J23 is connected to the input terminal (IN) 10c, the drain thereof is connected to the power supply terminal $V_{DD}$ 17, and the source thereof is connected to the drain of the FET J24.

The source of the FET J24 is grounded via the resistor R22, and the gate thereof is connected to the constant-current source bias terminal Vcs 14.

In the differentiating circuit 19a, reference character Ra designates a resistor and reference character Ca designates a capacitor. The resistor Ra and the capacitor Ca, serially connected to each other, are inserted between the connection node n21 of the FETs J21 and J22 and the ground, and the connection node $n_a$ between the resistor Ra and the capacitor Ca is connected to the output signal terminal (OUT1) 20a.

In the integrating circuit 19b, reference character Rb designates a resistor and reference character Cb designates a capacitor. The resistor Rb and the capacitor Cb, serially connected, are inserted between the connection node n23 of FET J23 and FET J24 and the ground, and the connection node $n_b$ between resistor Rb and capacitor Cb is connected to the output terminal (OUT2) 20b.

Reference characters V1 and V2 in the figure designate voltages at the connection node n21 between FET J21 and FET J22 and at the connection node n23 between FET J23 and FET J24, respectively, and reference characters Vout1 and Vout2 designate output voltages of signal output terminals (OUT1) 20a and (OUT2) 20b, respectively.

FIG. 22 is a diagram showing vectors V1, V2 (=V1), Vout1 and Vout2, when the values of the resistors Ra, Rb and the capacitors Ca, Cb of the differentiating circuit 19a and the integrating circuit 19b are set so as to satisfy the following:

$$Ra=Rb=R, \ Ca=Cb=C, \ f_0=1/(2\pi RC) \qquad (1)$$

at the design frequency $f_0$, supposing that the output impedances of the two source followers 16a, 16b in the 0°/90° phase shifter in FIG. 21 are sufficiently low. FIG. 22(a) is a vector diagram at frequency $f=f_0$, and FIG. 22(b) illustrates a vector diagram at a frequency other than $f=f_0$. In the figure, reference characters Ia, Ib designate a current flowing through the connection node $n_a$ between the resistor Ra and the capacitor Ca, and a current flowing through the connection node $n_b$ between the resistor Rb and the capacitor Cb, respectively. Reference character $\theta 1$ designates a phase difference between V1 and Vout1, and reference character $\theta 2$ designates a phase difference between V1 and Vout2. In addition, reference character O designates a node at the ground potential, and reference characters A, B, P designate terminuses of the vectors, respectively.

In FIG. 22(a), both $\triangle OAP$ and $\triangle OBP$ are right-angled isosceles triangles which are congruent with each other. Consequently, because at frequency $f=f_0$ the differentiating circuit 19a advances the phase of the input V1 by 45° and the integrating circuit 19b retards the phase of the input V2 by 45°, it is found that the phase difference between the outputs Vout1 and Vout2 ($\theta 1 + \theta 2$) is 90°. At this time, however, the amplitudes of the outputs Vout1 and Vout2 are reduced to lower values than the amplitude of the input V1 (=V2) due to the high pass characteristic of the differentiating circuit 19a and the low pass characteristic of the integrating circuit 19b.

In FIG. 22(b), the following formulae stand independently of the frequency from the relation of the formula (1):

$$OA=BP, \ AP=OB \ \text{and} \ \angle OAP = \angle OBP = 90°.$$

Consequently, $$\angle AOP = \angle BPO = \theta 1, \ \angle BOP = \angle APO = \theta 2, \text{ and} \\ \angle OAP = \angle OBP = 90°.$$

When it is considered that the sum of the three angles of a triangle is 180°, it follows that, $$\angle AOP + \angle BOP = \theta 1 + \theta 2 = 90°,$$

i.e., that the phase difference of the outputs Vout1 and Vout2 ($\theta 1 + \theta 2$) is still 90° at frequencies other than $f=f_0$.

However, the amplitudes of Vout1 and Vout2 are different from each other.

FIG. 23 is a diagram showing vectors V1, V2 (=V1), Vout1 and Vout2, when the resistance values of the resistors Ra, Rb (=Ra) constituting a different circuit 19a and an integrating circuit 19b in the 0°/90° phase shifter illustrated in FIG. 21 are a little larger than the design value R, or when the capacitance values of the capacitors Ca, Cb (=Ca) constituting a differentiating circuit 19a and an integrating circuit 19b in the 0°/90° phase shifter illustrated in FIG. 21 are a little larger than the design value C. Reference character $\theta 1$ in the figure designates a phase difference between V1 and Vout1, and reference character $\theta_2$ designates a phase difference between V1 and Vout2.

From this figure, it is found that when the circuit elements, i.e., the resistors Ra, Rb and the capacitors Ca, Cb vary, the angle $\theta_1$ produced by Vout1 and V1 is small, the angle $\theta_2$ produced by Vout2 and V2 is large, and the amplitudes of Vout1 and Vout2 are different from each other at frequency $f=f_0$, while the sum of the both phase differences ($\theta_1+\theta_2$) is still kept at 90°.

FIG. 24 shows a diagram illustrating amplitude characteristics of the output signals Vout1 and Vout2 as a function of input frequency of the 0°/90° phase shifter shown in FIG. 21. From this figure, it is found that the frequency at which the amplitudes of the output signals Vout1 and Vout2 become equal to each other is only $f=f_0$ due to the high pass characteristic of the differentiating circuit 19a and the low pass characteristic of the integrating circuit 19b.

As described above, a 0°/90° phase shifter including a signal separating circuit comprising a differentiating circuit and an integrating circuit, can be structured with only resistors and capacitors, or resistors, capacitors and transistors, which are appropriate for circuit integration and miniaturization. Further, the operation characteristics of the phase shifter can maintain orthogonality over a wide band as well as a high degree of the orthogonality as a function of element variations. As is seen from the frequency characteristics in FIG. 24, however, the amplitude error of the carrier at other than the central frequency $f_0$ is large, and when a quadrature modulator using this 0°/90° phase shifter is employed, the carrier waves with large amplitude errors are directly input to double balanced mixers, thereby still generating spurious components, not resulting in preferable modulator characteristics.

SUMMARY OF THE INVENTION

It is an object of the present invention to provide a quadrature modulator that has superior modulation characteristics with fewer spurious components and that enables circuit integration easily as well as without adjustment.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to the those skilled in the art from this detailed description.

According to a first aspect of the present invention, a quadrature modulator includes a 0°/90° phase shifter which, comprising resistors and capacitors, or resistors, capacitors, and transistors, separates the input carrier wave into two carrier waves having a 90° phase difference according to its differentiating characteristics and integrating characteristics. The quadrature modulator, further, includes amplitude compensating circuits which convert the above two carrier waves in sinusoidal waveform into signals having rectangular waveform and predetermined amplitudes, inserted between the phase shifter and the double-balanced mixers. Since the phase shifter comprises circuit elements appropriate for circuit integration and has a high degree in orthogonality as a function of variations in the characteristic values of the circuit elements, and, further, amplitude compensating circuits converting the output carrier waves from the 0°/90° phase shifter to rectangular waveform signals having constant amplitudes, are provided, complementary carriers having high precision orthogonality and superior balance are input to double-balanced mixers. Accordingly, a superior modulation wave with fewer spurious components can be obtained easily as well as without adjustment. Further, circuit integration for a quadrature modulator is simplified.

BRIEF DESCRIPTION OF THE DRAWINGS

FIGS. 9(a) and 9(b) are vector diagrams explaining the operation of the 0°/90° phase shifter shown in FIG. 8;

FIG. 10 is a diagram illustrating the frequency characteristics of the output signals of the 0°/90° phase shifter shown in FIG. 8;

FIGS. 17(a) and 17(b) are views illustrating a construction of the 0°/90° phase shifter in FIG. 15;

FIGS. 18(a)-18(c) are views illustrating a construction of the 0°/90° phase shifter in FIG. 15;

FIG. 21 is a circuit diagram illustrating a construction of the 0°/90° phase shifter in FIG. 15;

FIGS. 22(a) and 22(b) are vector diagrams explaining the 0°/90° phase shifter in FIG. 21;

DETAILED DESCRIPTION OF THE PREFERRED EMBODIMENT

Embodiment 1

Figure 1:
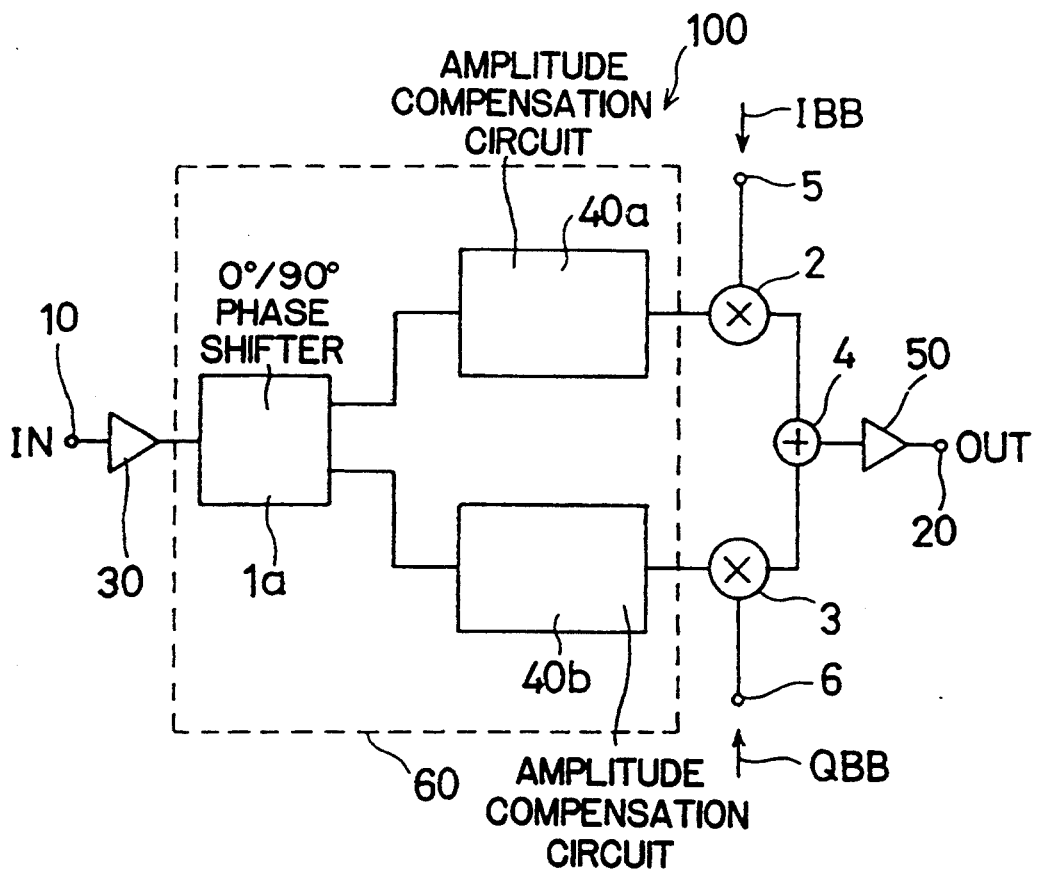
FIG. 1 is a block diagram illustrating a construction of a quadrature modulator in accordance with a first embodiment of the present invention.
Figure 15:
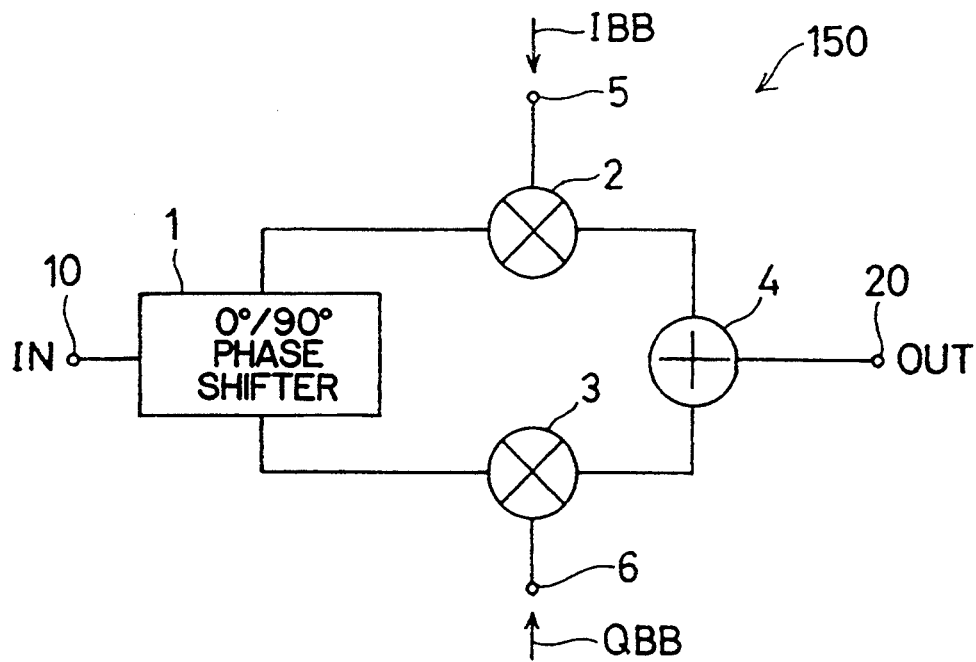
FIG. 15 is a block diagram illustrating a construction of a conventional quadrature modulator.
Figure 16:
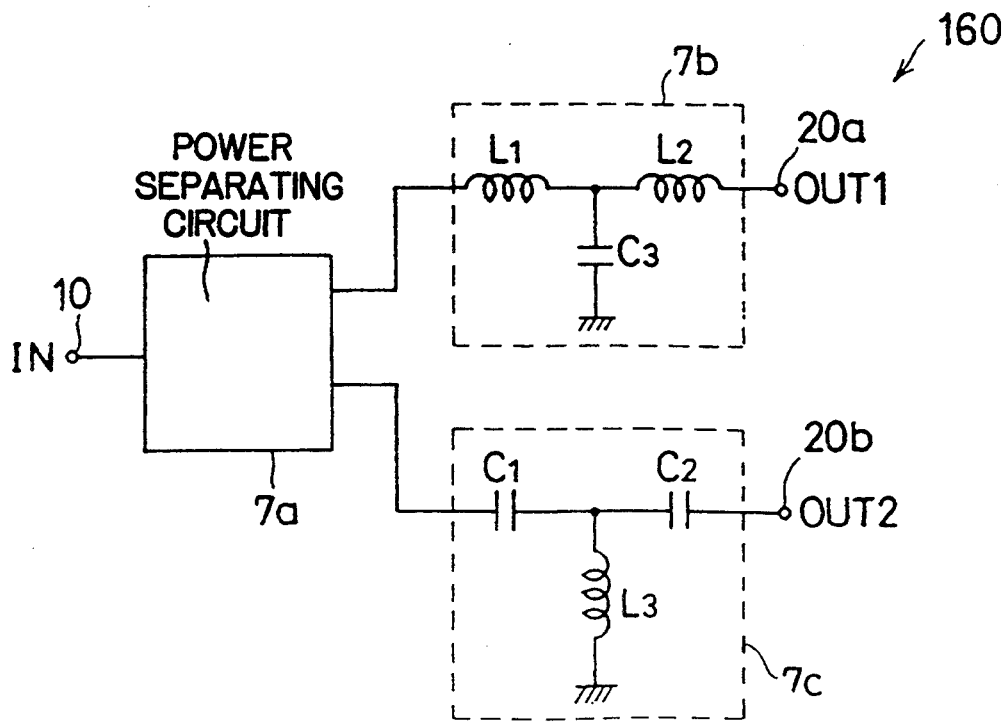
FIG. 16 is a circuit diagram illustrating a construction of the 0°/90° phase shifter in FIG. 15.

FIG. 1 is a block diagram schematically illustrating a circuit construction of a quadrature modulator according to a first embodiment of the present invention. In the figure, the same reference numerals designate the same or corresponding elements as those in FIG. 15. Reference numeral 100 designates a quadrature modulator. This quadrature modulator 100 includes a 0°/90° phase shifter 1a which is connected to the input terminal 10 via an input buffer 30 and which provides a signal separating circuit including a differentiating circuit and an integrating circuit, or their equivalents, amplitude compensation circuits 40a, 40b waveform for converting the output carrier in a sinusoidal waveform from the 0°/90° phase shifter to a carrier in rectangular waveform, respectively, double-balanced mixers 2 and 3 performing modulation by mixing base band signals with the output carriers from the amplitude compensating circuits 40a and 40b, and an in-phase synthesizer 4 synthesizing the modulation signals of the double-balanced mixers 2 and 3 to output the same to the signal output terminal (OUT) 20. Reference numeral 50 designates an output buffer, and reference numeral 60 designates a phase shifter section, i.e., a circuit section including the 0°/90° phase shifter 1a and the amplitude compensating circuits 40a and 40b.

The double-balanced mixer 2 is that at the I (Inphase) channel to which the in-phase base band signal $I_{BB}$ is input, and the double-balanced mixer 3 is that at the Q (Quadrature-phase) channel to which the quadrature-phase base band signal $Q_{BB}$ is input.

Figure 2:
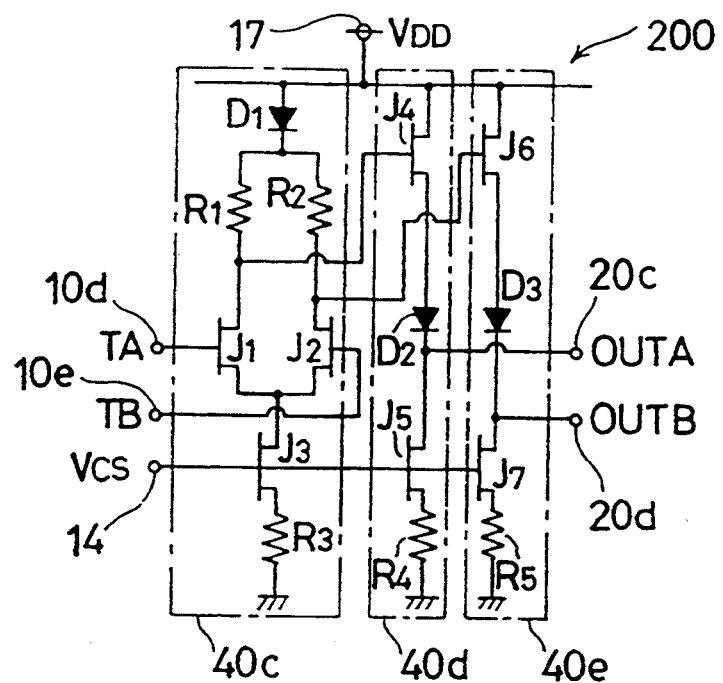
FIG. 2 is a circuit diagram of an amplifier circuit of the amplitude compensating circuit shown in FIG. 1.
Figure 4:
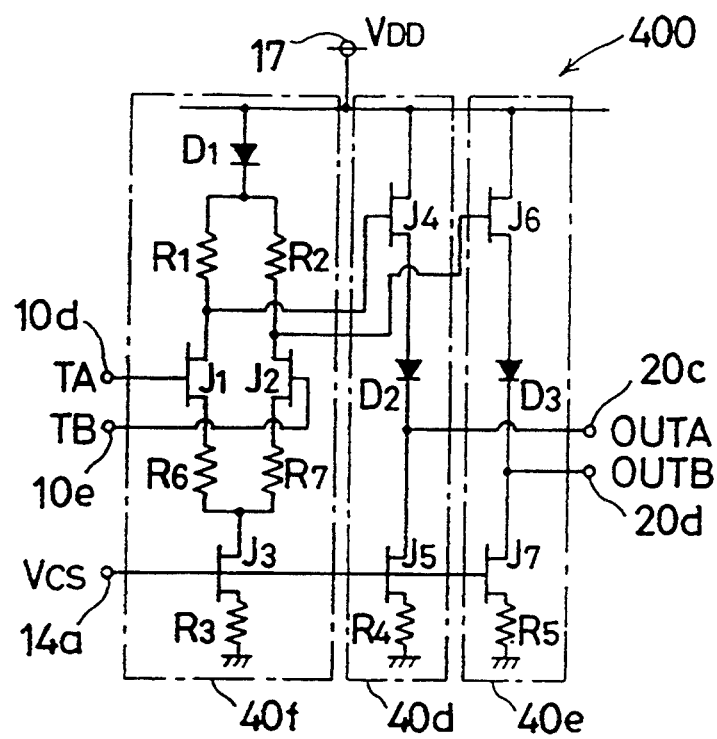
FIG. 4 is a circuit diagram of another amplifier circuit constituting the amplitude compensating circuit shown in FIG. 1.

FIGS. 2 and 4 show circuit constructions of amplifier circuits, which function as basic circuits in the amplitude compensating circuits 40a, 40b.

In FIG. 2, reference numeral 200 designates an amplifier circuit. This amplifier circuit 200 includes a differential amplifier circuit 40c connected to a positive phase signal input terminal (TA) 10d and a negative phase signal input terminal (TB) 10e, and two source followers 40d and 40e which output the output signals of this differential amplifier circuit 40c to the output terminals ($OUT_A$) 20c and ($OUT_B$) 20d, respectively.

In the differential amplifier circuit 40c, reference characters J1 to J3 designate FETs, reference character D1 designates a diode, reference characters R1 to R3 designate resistors, and the gate of FET J1 is connected to the positive phase signal input terminal (TA) 10d, and the source thereof is connected to resistor R1. The gate of FET J2 is connected to the negative phase signal input terminal (TB) 10e, the source thereof is connected to the drain of FET J3, and the drain thereof is connected to resistor R2. The gate of FET J3 is connected to the constant current bias terminal Vcs 14, and the source thereof is grounded via resistor R3. One of the terminals of each of the resistors R1, R2 is connected to the power supply terminal 17 via diode D1.

In the source follower 40d, reference characters J4, J5 designate FETs, reference character D2 designates a diode, reference character R4 designates a resistor, and the gate of FET J4 is connected to the connection node between resistor R1 and FET J1, the drain thereof is connected to the power supply terminal ($V_{DD}$) 17, and the source thereof is connected to the drain of FET J5 via diode D2. The source of FET J5 is grounded via resistor R4, and the gate thereof is connected to the constant current source bias terminal Vcs 14.

In the source follower 40e, reference characters J6, J7 designate FETs, reference character D3 designates a diode, reference character R5 designates a resistor, and the gate of FET J6 is connected to the connection node between resistor R2 and FET J2, the drain thereof is connected to the power supply terminal ($V_{DD}$) 17, and the source thereof is connected to the drain of FET J7 via diode D3. The source of FET J7 is grounded via resistor R5, and the gate thereof is connected to the constant current source bias terminal Vcs 14.

In FIG. 4, the same reference numerals designate the same or corresponding elements as those in FIG. 2. Reference numeral 400 designates an amplifier circuit. This amplifier circuit 400 is obtained by replacing the differential amplifier circuit 40c of the amplifier circuit 200 in FIG. 2 with a differential amplifier circuit 40f. The differential amplifier circuit 40f is obtained by inserting resistors R6, R7 between the FETs J1, J2 and the FET J3 of the differential amplifier circuit 40c shown in FIG. 2, respectively.

When the resistors R6, R7 are set to approximately several kΩ, the differential gain of this amplifier circuit is approximately represented by R1/R6 (here, supposed that R1=R2, R6=R7). When the resistances R1 and R6 are approximately equal to each other, the differential gain of this amplifier circuit amounts to almost 1, but the input impedance is higher than that in the amplifier circuit 200 of FIG. 2 including neither R1 nor R6.

The amplitude compensating circuits 40a, 40b are obtained by connecting the amplifier circuits shown in FIGS. 2 and 4, respectively, in three or four stages in cascade connection, so as to have sufficient voltage gains as a whole. Amplitude compensating circuits 40a, 40b convert the carriers of sinusoidal waveform which are output from the 0°/90° phase shifter 1a to rectangular waves having constant amplitudes. Because the input impedance of the amplifier circuit 400 in FIG. 4 is higher than that of the amplifier circuit 200 in FIG. 2 as above described, it is preferable that the amplifier circuit 400 in FIG. 4 is provided in the first stage of the amplitude compensating circuits 40a, 40b in view of operation characteristics of the 0°/90° phase shifter 1a.

Figure 6:
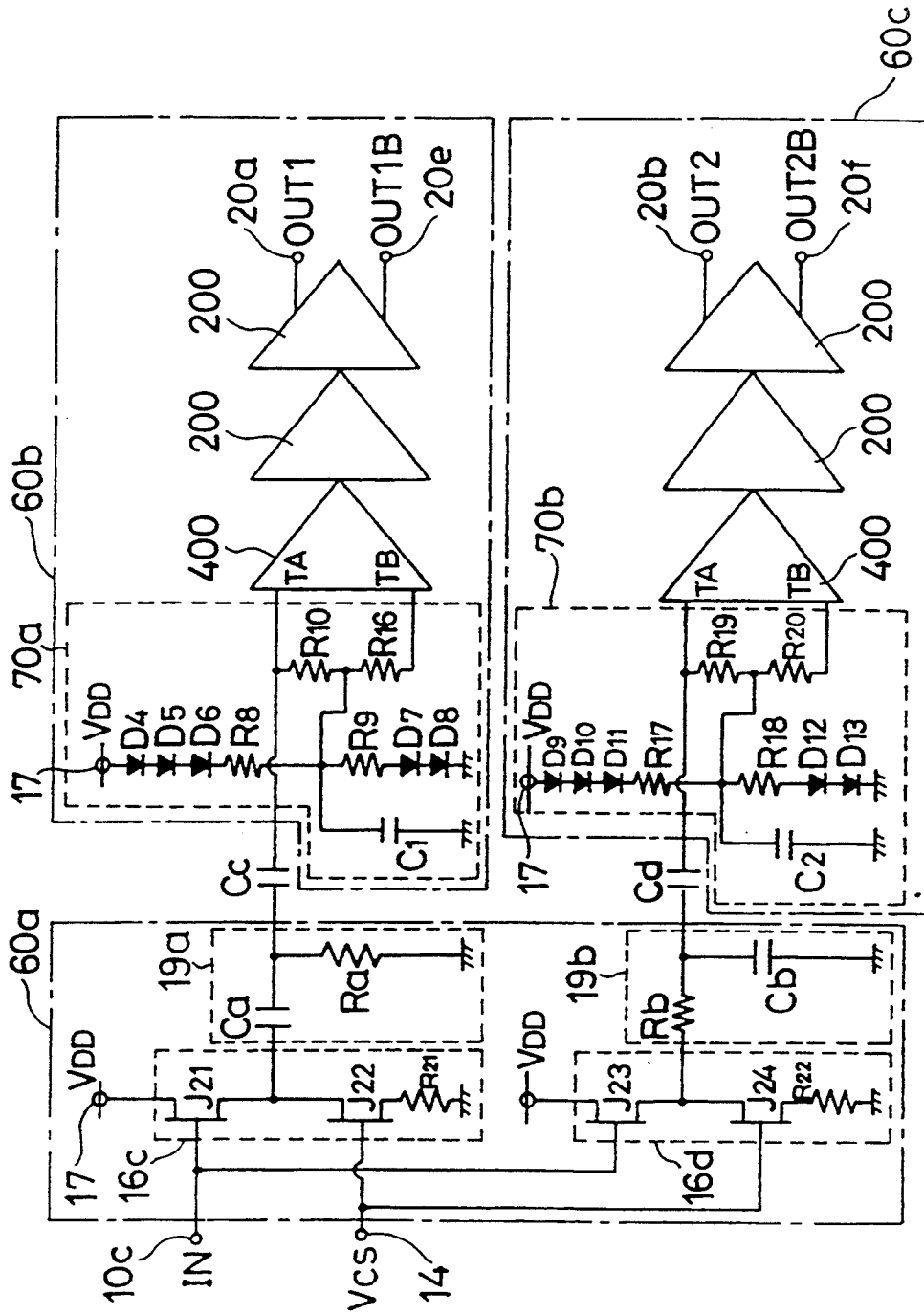
FIG. 6 is a circuit diagram illustrating a phase shifter section shown in FIG. 1.

FIG. 6 shows a diagram illustrating more concretely a circuit construction of the phase shifter section 60 of FIG. 1. In the figure, reference character 60a designates a 0°/90° phase shifter having the same circuit construction as that of the 0°/90° phase shifter in FIG. 21. Reference characters 60b, 60c designate amplitude compensating circuits including the amplifier circuits illustrated in FIGS. 2 and 4. These amplitude compensating circuits 60b, 60c are respectively obtained by connecting the amplifier circuit 400 in FIG. 4 and two amplifier circuits 200 in FIG. 2 to bias circuits 70a, 70b at their input first stages, respectively, in this order. Reference characters Cc, Cd designate capacitors for coupling the 0°/90° phase shifter 60a and the amplitude compensating circuits 60b, 60c for alternating current signals, respectively.

In the bias circuit 70a, reference characters D4 to D8 designate diodes, reference characters R8 to R16 designate resistors, reference character C1 designates a capacitor, and diodes D4 to D6, resistors R8, R9 and diodes D7, D8 are serially connected between the power supply terminal ($V_{DD}$) 17 and the ground, and the connection node between resistors R8 and R9 is grounded via capacitor C1. The resistors R10, R16 are serially connected between the positive phase signal input terminal (TA) and the negative phase signal input terminal (TB) of the amplifier circuit 400, and the connection node therebetween is connected to the connection node between resistors R8 and R9. The connection node between resistor R10 and the positive phase signal input terminal (TA) of the amplifier circuit 400 is connected to a differentiating circuit 19a via capacitor Cc. The negative phase signal input terminal (TB) is grounded for alternating current signals, becoming a reference terminal.

In the bias circuit 70b, reference characters D9 to D13 designate diodes, reference characters R17 to R20 designate resistors, reference character C2 designates a capacitor, diodes D9 to D11, resistors R17, R18 and diodes D12, D13 are serially connected between the power supply terminal ($V_{DD}$) 17 and the ground, and the connection node between resistors R17 and R18 is grounded via capacitor C2. The resistors R19, R20 are serially connected between the positive phase signal input terminal (TA) and the negative phase signal input terminal (TB) of the amplifier circuit 400, and the connection node therebetween is connected to the connection node between resistors R17 and R18. The connection node between resistor R19 and the positive phase signal input terminal (TA) of the amplifier circuit 400 is connected to an integrating circuit 19b via capacitor Cd. The negative phase signal input terminal (TB) is grounded for alternating current signals, becoming a reference terminal.

Next, a description is given of the operation.

In the 0°/90° phase shifter 60a, the differentiating circuit 19a is driven by the source follower 16c having high driving ability and low output impedance, including FETs J21, J22 and resistor R21, and the integrating circuit 19b is driven by the source follower 16d having high driving ability and low output impedance, including FETs J23, J24 and resistor R22. In other words, the input carrier wave signal input to the input signal terminal 10c is advanced in its phase by 45° by the differentiating circuit 19a at one side, and is retarded in its phase by 45° by the integrating circuit 19b at the other side, whereby the input carrier wave is separated into two signals orthogonal to each other, having a 90° phase difference. These two carriers are respectively input to the amplitude compensating circuits 60b, 60c, and converted from sinusoidal wave signals to rectangular wave signals by these circuits. Thereafter, the two waveform converted signals are modulated by the I-channel side double-balanced mixer 2 and the Q-channel side double-balanced mixer 3, and synthesized by the in-phase synthesizer 4 to be output to the output terminal 20.

The quadrature modulator of this first embodiment includes a 0°/90° phase shifter 60a which, including a differentiating circuit and an integrating circuit and having a circuit construction easy in circuit integration, separates the input carrier into two carrier waves thereby to output the signals having a 90° phase difference over a wide band independently of variations in characteristic values of the circuit elements. This quadrature modulator also includes the amplitude compensating circuits 60b, 60c which compensate the amplitude errors in the 0°/90° phase shifter 60a. The circuit integration of the quadrature modulator is performed easily and superior modulation wave spectrum with fewer spurious components is obtained because the complimentary carrier waves that are highly precise in their orthogonality as well as superior in balance are input to the double-balanced mixers 2, 3. Because the 0°/90° phase shifter 60a including a differentiating circuit and an integrating circuit is a two-input and two-output circuit, the area occupied on a chip by the 0°/90° phase shifter is reduced, thereby miniaturizing the quadrature modulator. In the amplitude compensating circuits 60b, 60c, the amplifier circuits 400 shown in FIG. 4 are provided at their input first stages and the impedances of the next stages viewed from the 0°/90° phase shifter 60a are made higher than the impedance of the 0°/90° phase shifter 60a. Therefore, the influences of the impedances on the 0°/90° phase shifter 60a are quite reduced, whereby the 0°/90° phase shifter 60a can operate in a more ideal state.

In this first embodiment, the amplitude compensating circuits 60b, 60c comprise three stages of differential-type amplifier circuits in cascade connection. When the output voltages of the 0°/90° phase shifter 60a are low due to the single-phase driving of the amplitude compensating circuits 60b, 60c, however, the stage number of the differential type amplifier circuits can be increased so as to obtain a gain required for the waveform-conversion.

There is a possibility that when the amplitude of each of the inputs to the amplitude compensating circuits 60b and 60c is low upon obtaining both signals of positive and negative phases from a single phase signal at the initial input stage, precise positive phase and precise negative phase signals cannot be obtained because of variations in the threshold voltages of the differential pair FETs of the differential amplifier circuits.

Embodiment 2

Figure 3:
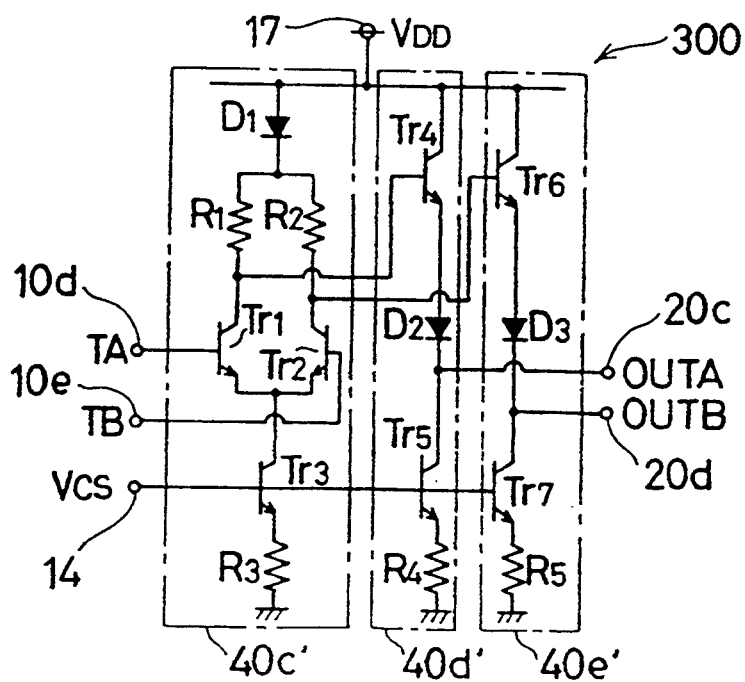
FIG. 3 is a circuit diagram of an amplifier circuit of the amplitude compensating circuit of the quadrature modulator in accordance with a second, a fourth, a sixth, or an eighth embodiment of the present invention.
Figure 5:
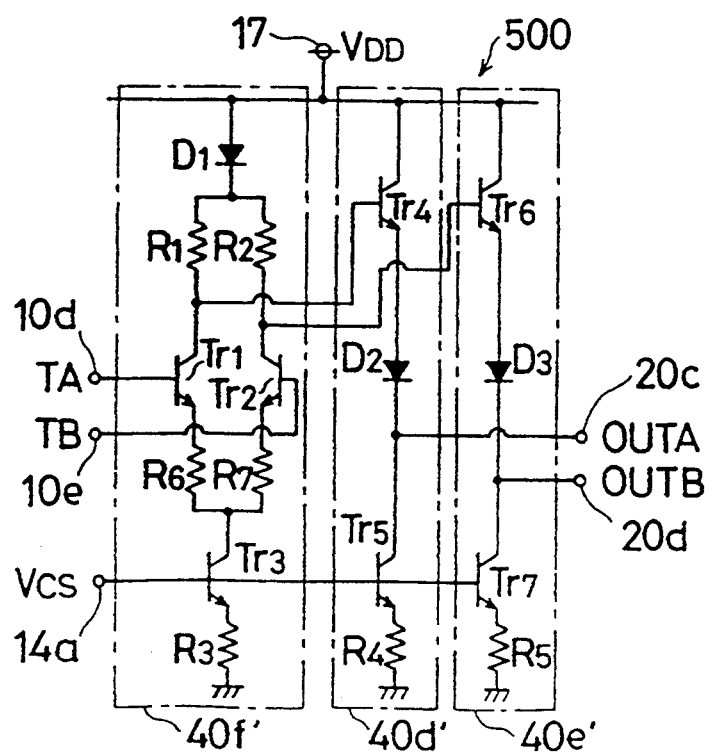
FIG. 5 is a circuit diagram of another amplifier circuit of the amplitude compensating circuit of the quadrature modulator in accordance with the second, the fourth, the sixth, or the eighth embodiment of the present invention.

A quadrature modulator according to a second embodiment of the present invention is one obtained by replacing FETs J21 to J24 in the 0°/90° phase shifter 60a of the quadrature modulator of the first embodiment with bipolar transistors, replacing the amplifier circuits 200 in the amplitude compensating circuits 60b, 60c with amplifier circuits 300 in FIG. 3, respectively, and replacing the amplifier circuits 400 in the amplitude compensating circuits 60b, 60c with amplifier circuit 500 in FIG. 5, respectively.

In FIG. 3, the same reference numerals designate the same or corresponding elements as those in FIG. 2. Reference numeral 300 designates an amplifier circuit. This amplifier circuit 300 includes a differential amplifier circuit 40c' connected to the positive phase signal input terminal (TA) 10d and the negative phase signal input terminal (TB) 10e, and two source followers 40d', 40e' outputting the outputs of this differential amplifier circuit 40c' to the output terminals ($OUT_A$) 20c and ($OUT_B$) 20d, respectively.

This amplifier circuit is obtained by replacing FETs J1 to J3 of the differential amplifier circuit 40c in the amplifier circuit in FIG. 2 with bipolar transistors Tr1 to Tr3, and the source followers 40d', 40e' are obtained by replacing FETs J4 to J7 of source followers 40d', 40e' in the amplifier circuit in FIG. 2 with bipolar transistors Tr4 to Tr7.

In FIG. 5, the same reference numerals designate the same or corresponding elements as those in FIGS. 3 and 4. Reference numeral 500 designates an amplifier circuit. This amplifier circuit 500 includes a differential amplifier circuit 40f' connected to positive phase signal input terminal (TA) 10d and negative phase signal input terminal (TB) 10e, and two source followers 40d', 40e' which, connected to the later stage of the differential amplifier circuit 40f', output the outputs of the differential amplifier circuit 40f' to the output terminals (OUT$_A$) 20c and (OUT$_B$) 20d, respectively. This amplifier circuit 40f' is obtained by replacing FETs J1 to J3 of the differential amplifier circuit 40f in the amplifier circuit of FIG. 4 with bipolar transistors Tr1 to Tr3.

The quadrature modulator of this second embodiment produces the same effects as that of the first embodiment.

Embodiment 3

Figure 7:
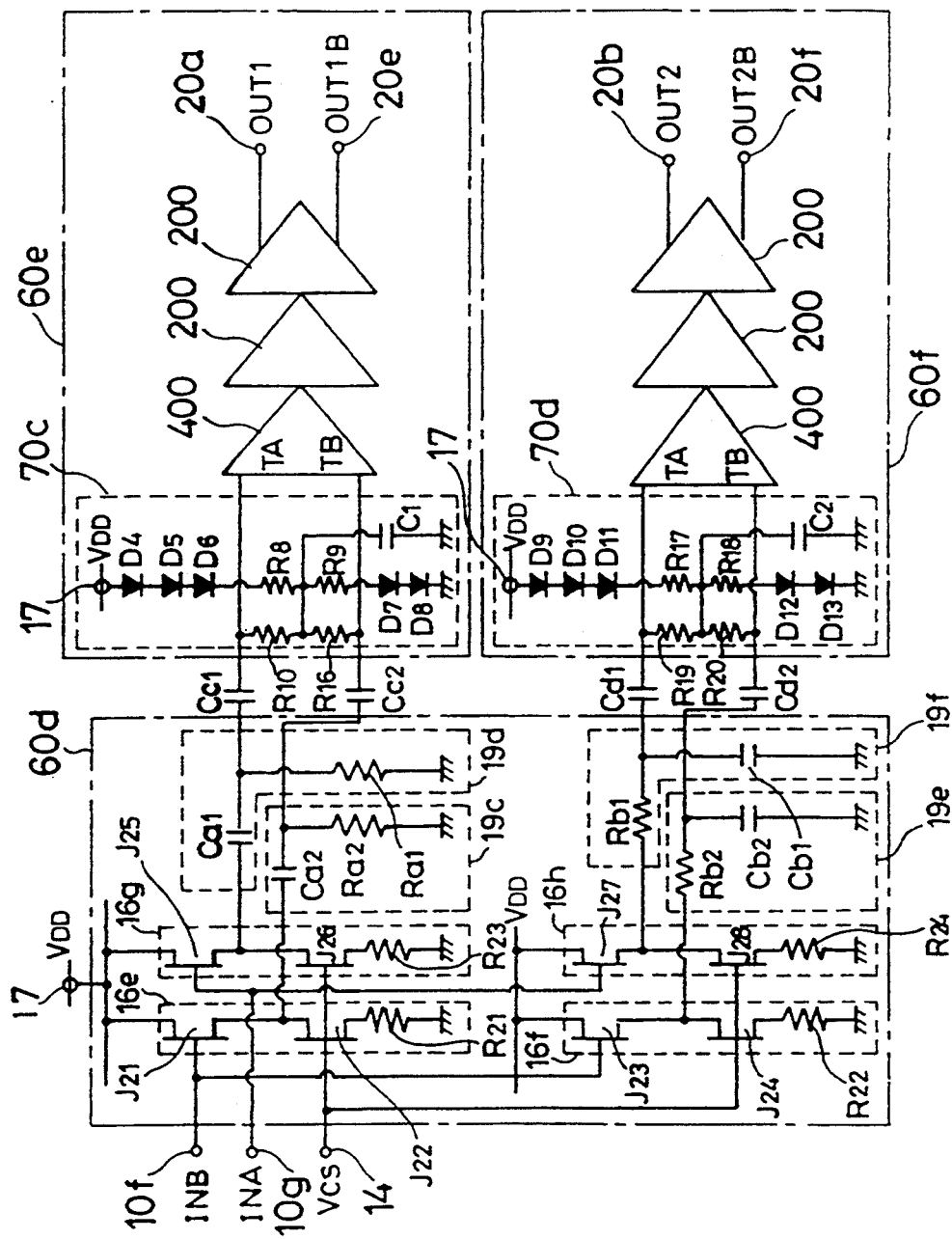
FIG. 7 is a circuit diagram illustrating a phase shifter section of the quadrature modulator in accordance with a third embodiment of the present invention.

The quadrature modulator according to a third embodiment of the present invention is obtained by using as the phase shifter section 60 shown in FIG. 1 a circuit of the type shown in FIG. 7.

In FIG. 7, reference character 60d designates a 0°/90° phase shifter including two differentiating circuits and two integrating circuits. This 0°/90° phase shifter 60d includes two source followers 16g, 16h both connected to a positive phase signal input terminal (INA) 10g, two source followers 16e, 16f both connected to a negative phase signal input terminal (INB), a differentiating circuit 19c receiving the output signal of the source follower 16e, a differentiating circuit 19d receiving the output of the source follower 16g, an integrating circuit 19e receiving the output of the source follower 16f, and an integrating circuit 19f receiving the output of the source follower 16h. Reference character 60e designates an amplitude compensating circuit, which is obtained by replacing the bias circuit 70a of the amplitude compensating circuit 60b shown in FIG. 6 with a bias circuit 70c. Reference character 60f designates an amplitude compensating circuit, which is obtained by replacing the bias circuit 70b of the amplitude compensating circuit 60c shown in FIG. 6 with a bias circuit 70d. Reference characters Cc1, Cc2, Cd1 and Cd2 designate capacitors for coupling the 0°/90° phase shifter 60a and the amplitude compensating circuits 60e, 60f for alternating current signals.

In the source follower 16e, reference characters J21, J22 designate FETs, reference character R21 designates a resistor, and the gate of FET J21 is connected to the negative phase signal input terminal (INB) 10f, the drain thereof is connected to the power supply terminal V$_{DD}$ 17, and the source thereof is connected to the drain of FET J22. The source of FET J22 is grounded via resistor R21 and the gate thereof is connected to the constant-current source bias terminal Vcs 14.

In the source follower 16g, reference characters J25, J26 designate FETs, reference character R23 designates a resistor, and the gate of FET J25 is connected to the positive phase signal input terminal (INA) 10g, the drain thereof is connected to the power supply terminal V$_{DD}$ 17, and the source thereof is connected to the drain of FET J26. The source of FET J26 is grounded via resistor R23 and the gate thereof is connected to the constant-current source bias terminal Vcs 14.

In the source follower 16f, reference characters J23, J24 designate FETs, reference character R22 designates a resistor, and the gate of FET J23 is connected to the negative phase signal input terminal (INB) 10f, the drain thereof is connected to the power supply terminal V$_{DD}$ 17, and the source thereof is connected to the drain of FET J24. The source of FET J24 is grounded via resistor R22 and the gate thereof is connected to the constant-current source bias terminal Vcs 14.

In the source follower 16h, reference characters J27, J28 designate FETs, reference character R24 designates a resistor, and the gate of FET J27 is connected to the positive phase signal input terminal (INA) 10g, the drain thereof is connected to the power supply terminal V$_{DD}$ 17, and the source thereof is connected to the drain of FET J28. The source of FET J28 is grounded via resistor R24 and the gate thereof is connected to the constant-current source bias terminal Vcs 14.

In the differentiating circuit 19c, reference character Ra2 designates a resistor, reference character Ca2 designates a capacitor, and resistor Ra2 and capacitor Ca2, serially connected, are connected between the connection node of FET J21, J22 and the ground.

In the differentiating circuit 19d, reference character Ra1 designates a resistor, reference character Ca1 designates a capacitor, and resistor Ra1 and capacitor Ca1, serially connected, are connected between the connection node of FET J25, J26 and the ground.

In the integrating circuit 19e, reference character Rb2 designates a resistor, reference character Cb2 designates a capacitor, and resistor Rb2 and capacitor Cb2, serially connected, are connected between the connection node of FET J23, J24 and the ground.

In the integrating circuit 19f, reference character Rb1 designates a resistor, reference character Cb1 designates a capacitor, and resistor Rb1 and capacitor Cb1, serially connected, are connected between the connection node of FET J27, J28 and the ground.

The bias circuit 70c has a circuit construction fundamentally the same as the bias circuit 70a shown in FIG. 6. In this bias circuit 70c, the connection node of resistor R10, which is one of resistors R10, R16 serially connected between the positive phase signal input terminal (TA) and the negative phase signal input terminal (TB), and the positive phase signal input terminal (TA), is connected to the differentiating circuit 19d via capacitor Cc1. The connection node of resistor R16, which is the other of the above described two resistors, and the negative phase signal input terminal (TB), is connected to the differentiating circuit 19c via capacitor Cc2.

The bias circuit 70d has a circuit construction fundamentally the same as the bias circuit 70b shown in FIG. 6. In this bias circuit 70d, the connection node of resistor R19, which is one of resistors R19, R20 serially connected between the positive phase signal input terminal (TA) and the negative phase signal input terminal (TB), and the positive phase signal input terminal (TA), is connected to the differentiating circuit 19f via capacitor Cd1. The connection node of resistor R20, which is the other of the above described two resistors, and the negative phase signal input terminal (TB), is connected to the differentiating circuit 19f via capacitor Cd2.

Next, a description is given of the operation.

In the 0°/90° phase shifter 60d, the differentiating circuits 19c, 19d and the integrating circuits 19e, 19f are driven by the source followers 16e to 16h having high driving ability and low output impedance. The two-phase carrier signals including a positive phase carrier signal and a negative phase carrier signal, are required as input signals which are to be input to this 0°/90° phase shifter. Those carrier signals can be obtained easily by providing an input buffer comprising a differential amplifier circuit or the like, at the first stage of this 0°/90° phase shifter 60d. The positive phase input carrier wave which is input to the positive phase input terminal (INA) 10g is advanced in its phase by 45° by the differentiating circuit 16g at one side, and is retarded in its phase by 45° by the integrating circuit 16h at the other side. In other words, the input carrier wave is separated into two signals orthogonal to each other, i.e., signals having a 90° phase difference. Similarly, the negative phase input carrier wave which is input to the negative phase input terminal (INB) 10f, is advanced in its phase by 45° by the differentiating circuit 16e at one side, and is retarded in its phase by 45° by the integrating circuit 16f at the other side, i.e., the input carrier wave is separated into two signals orthogonal to each other, i.e., having a 90° phase difference. As a result, the orthogonal carrier waves are separated into four phase carriers of 0°, 90°, 180°, 270°. These four carriers are input to the amplitude compensating circuits 60e, 60f, and converted from sinusoidal wave signals to rectangular wave signals by these circuits. Thereafter, the four waveform converted signals are modulated by the I-channel side double-balanced mixer 2 and the Q-channel side double-balanced mixer 3, and synthesized by the in-phase synthesizer 4 to be output to the output terminal 20, similarly to the first embodiment.

The quadrature modulator of this third embodiment produces the same effects as that of the first embodiment. In addition, because the amplitude compensating circuits 60e, 60f are driven by a two-phase driving, i.e., driven with positive phase and negative phase signals, the quadrature modulator of this embodiment can utilize two times the amplitude of the input carrier of the quadrature modulator in the first embodiment, and can operate with high operation ability even for input carrier waves with small amplitude. In addition, due to the two-phase driving, the influences on the phases of signals by variations in threshold voltages of the pairs of FETs of the differential amplifier circuits in the amplifier circuits 400, 200 are reduced, thereby operating advantageously at high frequencies where the circuit gain is reduced.

When this quadrature modulator that includes a 0°/90° phase shifter 60d of four-input and four-output circuit construction, is actually integrated in an IC chip, the area of the 0°/90° phase shifter 60d, occupying the chip, is larger than that of the 0°/90° phase shifter 60a shown in FIG. 6, and the resistors and the capacitors of the differentiating circuits 19c, 19d and the integrating circuits 19e, 19f, cannot be arranged closer to each other than those of the 0°/90° phase shifter 60a in FIG. 6. Therefore, if the values of these resistors and capacitors deviate from the target values during manufacture, it is difficult to separate signals to two signals having a 90° phase difference with high precision. Consequently, in this quadrature modulator, the precision of orthogonality in separating signals into two signals having a 90° phase difference is lower than that of the quadrature modulator of the first embodiment.

Embodiment 4

The quadrature modulator according to a fourth embodiment of the present invention is obtained by replacing FETs J21 to J28 in the 0°/90° phase shifter 60d of the quadrature modulator of the third embodiment with bipolar transistors, replacing the amplifier circuits 200 of the amplitude compensating circuits 60e, 60f with the amplifier circuits 300 in FIG. 3, respectively, and replacing the amplifier circuits 400 of the amplitude compensating circuits 60e, 60f with the amplifier circuits 500 in FIG. 5, respectively.

The quadrature modulator of this fourth embodiment produces the same effects as that of the third embodiment.

Embodiment 5

Figure 8:
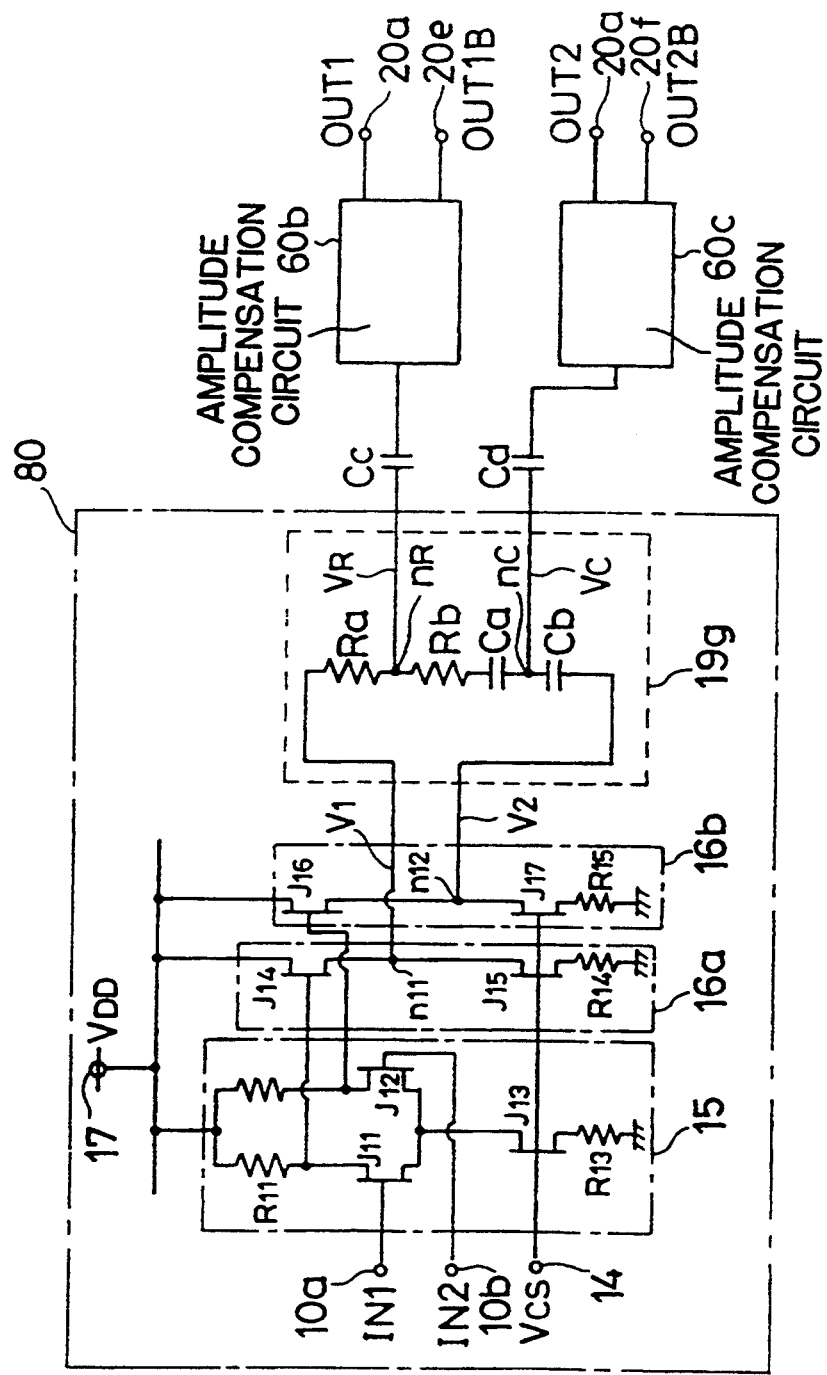
FIG. 8 is a circuit diagram illustrating a phase shifter section of the quadrature modulator in accordance with a fifth embodiment of the prevent invention.

FIG. 8 shows a circuit diagram illustrating a construction of a phase shifter section of the quadrature modulator according to a fifth embodiment of the present invention. In FIG. 8, the same reference numerals designate the same or corresponding elements as those in FIGS. 6 and 19, and reference numeral 80 designates a 0°/90° phase shifter. The quadrature modulator of this embodiment is obtained by replacing the 0°/90° phase shifter 60d of the phase shifter section 60 in the quadrature modulator of the first embodiment with the 0°/90° phase shifter 80.

Figure 19:
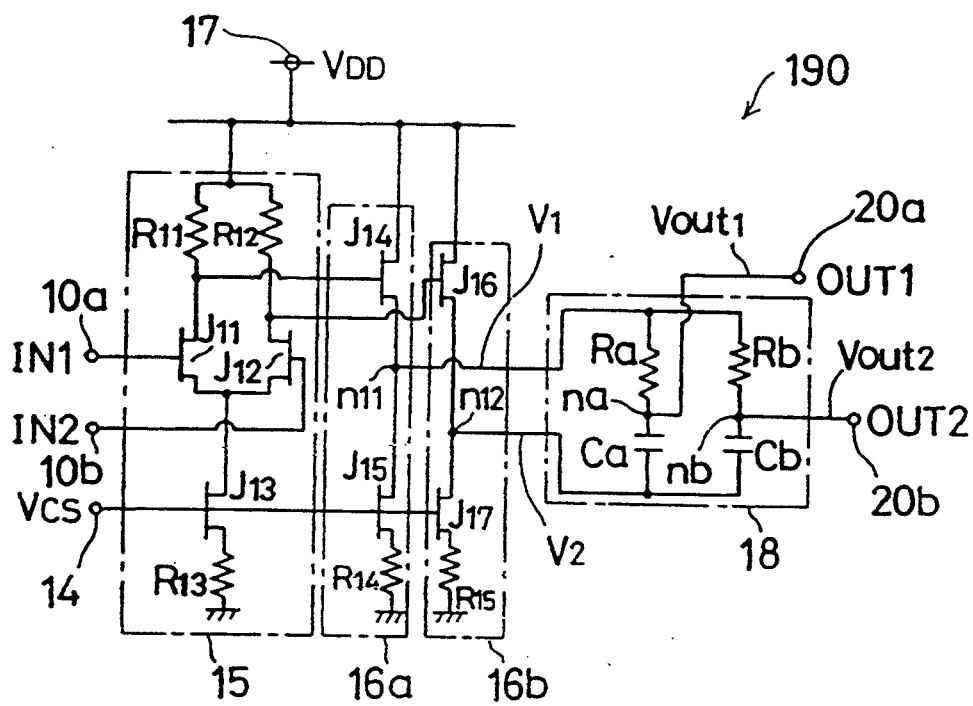
FIG. 19 is a circuit diagram illustrating a construction of the 0°/90° phase shifter in FIG. 15.
Figure 20:
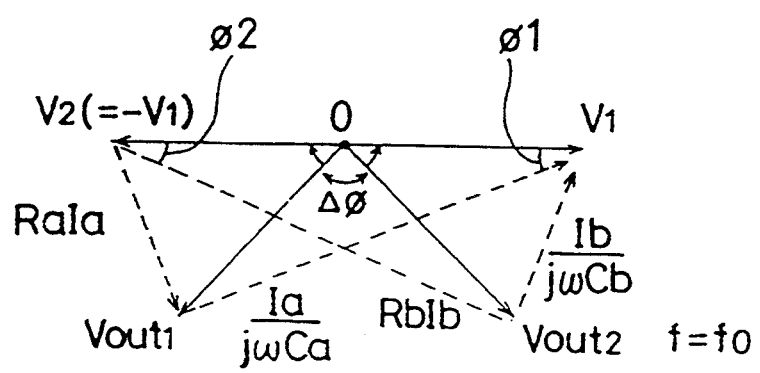
FIG. 20 is a vector diagram explaining operation of the 0°/90° phase shifter in FIG. 19.
Figure 23:
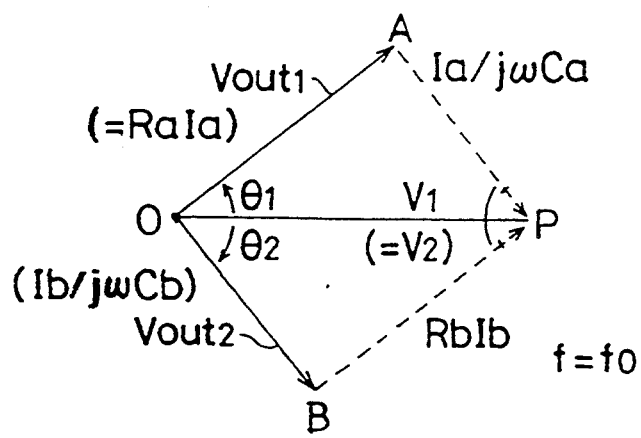
FIG. 23 is a vector diagram explaining the 0°/90° phase shifter in FIG. 21.
Figure 24:
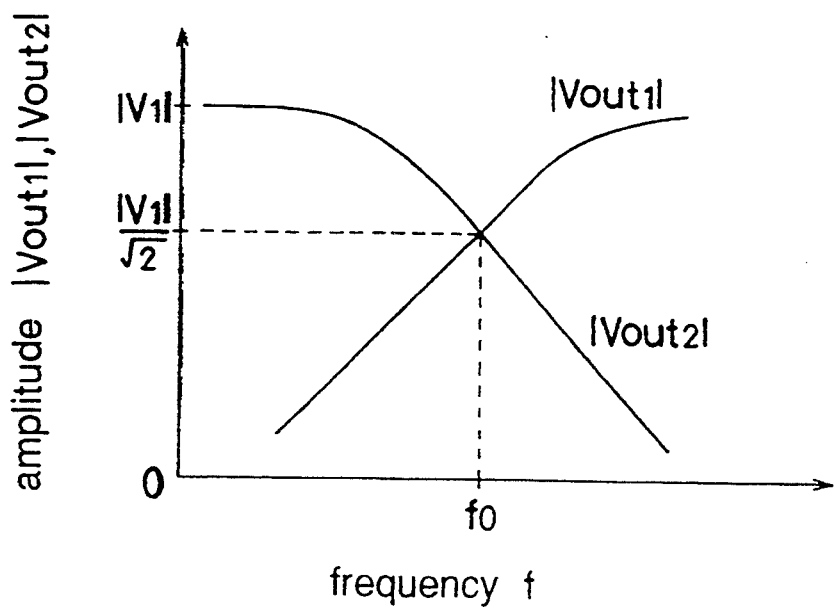
FIG. 24 is a diagram illustrating frequency characteristics of the output signals of the 0°/90° phase shifter in FIG. 21.

The 0°/90° phase shifter 80 is obtained by replacing the signal separating circuit 18 of the 0°/90° phase shifter shown in FIG. 19 with a signal separating circuit 19g. The signal separating circuit 19g is obtained by serially connecting a first serial connection of resistors Ra, Rb and a second serial connection of capacitors Ca, Cb between the connection nodes n11, n12 of the source followers 16a, 16b, respectively. The connection node $n_r$ of resistors Ra, Rb and the connection node $n_c$ of capacitors Ca, Cb are connected to the amplitude compensating circuits 60b, 60c via capacitors Cc, Cd, respectively. The capacitors Cc, Cd are provided for respectively coupling the outputs of the 0°/90° phase shifter 80 and the amplitude compensating circuits 60b, 60c for alternating current signals.

The signal separating circuit 19g has the circuit construction of a differentiating circuit when the connection node $n_r$ is seen from the connection node n11 as a reference, and also has the circuit construction of an integrating circuit when the connection node $n_c$ is viewed from the connection node n12 as a reference, whereby the signal separating circuit 19g operates as a circuit having both the characteristics of a differentiating circuit and an integrating circuit.

In the figure, reference characters V1, V2 designate voltages of the nodes n11, n12, respectively. Reference characters $V_R$, $V_C$ designate voltages of the nodes $n_r$, $n_c$ which are output from the signal separating circuit 19g.

In the figure, the differential amplifier circuit 15 is provided as a means for inputting signals of reverse phases to the gates of FETs J14, J16 of the source followers 16a, 16b, respectively. The input signals which are input to the positive phase input terminal (IN1) 10a and the negative phase input terminal (IN2) 10b, respectively, are not necessarily required to be of reverse phases. Either of the two signals can be a reference voltage.

A description is given that this 0°/90° phase shifter 80 has the same characteristics as that of the 0°/90° phase shifter 60a including a differentiating circuit and an integrating circuit shown in FIG. 6 of the first embodiment.

FIGS. 9(a) and 9(b) are diagrams showing vectors, the input voltages V1, V2 (=−V1) and the output voltages $V_R$, $V_C$, when the values of resistors Ra, Rb and capacitors Ca, Cb of the signal separating circuit 19g are set so as to satisfy the following:

$$Ra=Rb=R, \ Ca=Cb=C, \ f_0=1/(2\pi RC) \quad (1)$$

at the target frequency (i.e., design frequency $f_0$), supposing that the output impedances of the two source followers 16a, 16b of the 0°/90° phase shifter in FIG. 8 are sufficiently low. FIG. 9(a) illustrates a vector diagram at frequency $f=f_0$, and FIG. 9(b) illustrates a vector diagram at a frequency other than $f=f_0$ (here $f>f_0$). In the figure, reference character I designates a current flowing through the signal separating circuit 19g, i.e., a current flowing through the connection nodes nR, nC. Reference character $\Delta\phi$ represents a phase difference between output voltage $V_R$ and input voltage $V_C$, reference character O designates a node of the ground potential, and reference characters A, B, Q, P designate terminuses of the vectors, respectively.

In FIG. 9(a), because the resistor and capacitor in voltage vectors $RaI(RbI)$ and $I/j\omega Ca$ ($I/j\omega Cb$) have phase differences of 90°, $\triangle ABC$ is a right-angled isosceles triangle, i.e., $AB=BC$, and $ABC=90°$. In addition, the following formula stands from the relation of formula (1):

$$AP=PB=BQ=QC \text{ and } \angle AOP=\angle COQ=45°,$$

Consequently, the following formula also stands:

$$OP=OQ \text{ and } \angle POQ=\Delta\phi=90°.$$

Therefore, it is found that the amplitudes of output voltages $V_R$, $V_C$ are equal to each other and the phase difference between output voltages $V_R$, $V_C$ is 90°. However, the amplitudes of output voltages $V_R$, $V_C$ are smaller than the amplitude of the input voltage V1 $(=V2)$.

In FIG. 9(b), because the nodes P, Q are taken out from the center points of AB, BC, respectively, the following formula stands:

$$AP=PB, BQ=QC.$$

Because $OA=OC$ unchangeably stands, the following formula also stands:

$$OP//AB, OP//BC.$$

Consequently, it is found that both $\triangle OAB$, $\triangle COQ$ are right-angled isosceles triangles and $\square OPBQ$ is a rectangle, thereby $\angle POQ=\Delta\phi$ stands and the phase difference between output voltages $V_R$, $V_C$ is 90°. However, the lengths of OP, OQ are different, and the amplitudes of output voltages $V_R$, $V_C$ are different.

FIG. 10 shows amplitude characteristics of the output signals (i.e., voltages) $V_R$, $V_C$ as a function of input frequencies of the 0°/90° phase shifter in FIG. 8. This figure shows that the frequency at which the amplitudes of the output signals $V_R$ and $V_C$ are equal to each other is only $f=f_0$, because the output signal $V_R$ is subjected to the low pass characteristics and the output signal $V_C$ is subjected to the high pass characteristics, respectively.

Figure 11:
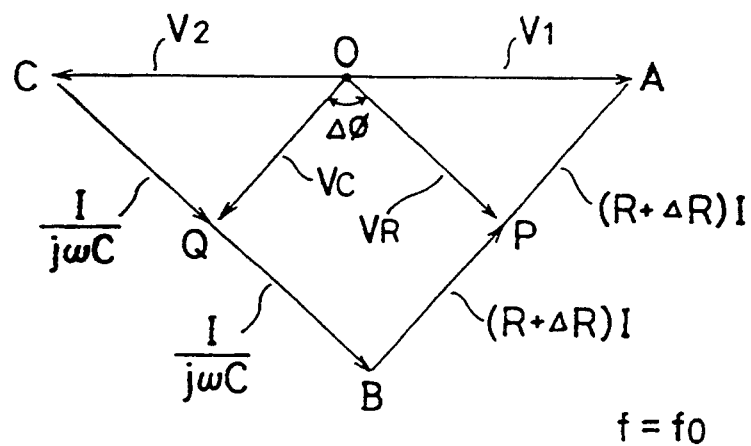
FIG. 11 is a vector diagram explaining the operation of the 0°/90° phase shifter shown in FIG. 8.

FIG. 11 is a diagram showing vectors, input voltages V1, V2 ($=-V1$), and output voltages $V_R$, $V_C$ when the resistances Ra, Rb (Ra=Rb) of the signal separating circuit 19g of the 0°/90° phase shifter in FIG. 8 are larger by $\Delta R$ than the design value R. Reference character $\Delta\phi$ in the figure represents a phase difference between output voltage $V_R$ and input voltage $V_C$. From FIG. 11, it is found that the angle produced by $V_R$ and V1 is large, the angle produced by $V_C$ and V2 ($=-V1$) is small, and the amplitudes $V_R$, $V_C$ are different at frequency $f=f_0$, while the phase difference $\Delta\phi$ between both is kept at 90°.

Figure 12:
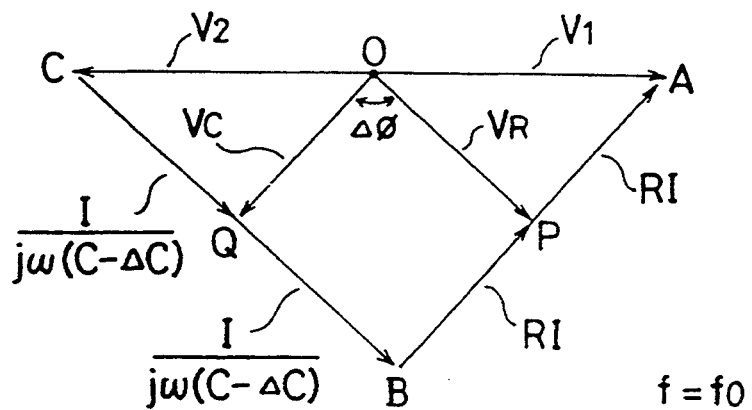
FIG. 12 is a vector diagram explaining the operation of the 0°/90° phase shifter shown in FIG. 8.

FIG. 12 is a diagram showing vectors of input voltages V1, V2 ($=-V1$) and output voltages $V_R$, $V_C$, when the capacitances Ca, Cb (Ca=Cb) constituting the signal separating circuit 19g of the 0°/90° phase shifter in FIG. 8 are smaller by $\Delta C$ than the design value C. Reference character $\Delta\phi$ in the figure designates a phase difference between output voltage $V_R$ and output voltage $V_C$. From FIG. 12, it is found that the angle produced by $V_R$ and V1 is small, the angle produced by $V_C$ and V2 ($=-V1$) is large, and the amplitudes $V_R$, $V_C$ are different at frequency $f=f_0$, while the phase difference $\Delta\phi$ between the both is kept at 90°.

As shown in FIGS. 10, 11 and 12, this 0°/90° phase shifter has advantages of being appropriate for circuit integration and being of a small size due to being composed only of resistors, capacitors and transistors, and that the operation characteristics maintains orthogonality of signals over a wide band as well as high precision of the orthogonality as a function of element variations. However, this 0°/90° phase shifter has some non-preferable characteristics as does the 0°/90° phase shifter 60a including a differentiating circuit and an integrating circuit, shown in FIG. 6, i.e., produces amplitude errors at other than the center frequency, which increase with distance from the center frequency.

Thus, the quadrature modulator in this fifth embodiment is obtained by replacing the 0°/90° phase shifter 60a of the quadrature modulator in the first embodiment with the 0°/90° phase shifter 80 shown in FIG. 8, and produces the same effects as that of the first embodiment.

Embodiment 6

The quadrature modulator according to a sixth embodiment of the present invention is obtained by replacing FETs J11 to J17 in the 0°/90° phase shifter 80 of the quadrature modulator of the fifth embodiment with bipolar transistors, replacing the amplifier circuits 200 in the amplitude compensating circuits 60a, 60b with the amplifier circuits 300 in FIG. 3, respectively, and replacing the amplifier circuits 400 in the amplitude compensating circuits 60a, 60b with the amplifier circuits 500 in FIG. 5, respectively.

The quadrature modulator of this sixth embodiment produces the same effects as that of the fifth embodiment.

Embodiment 7

Figure 13:
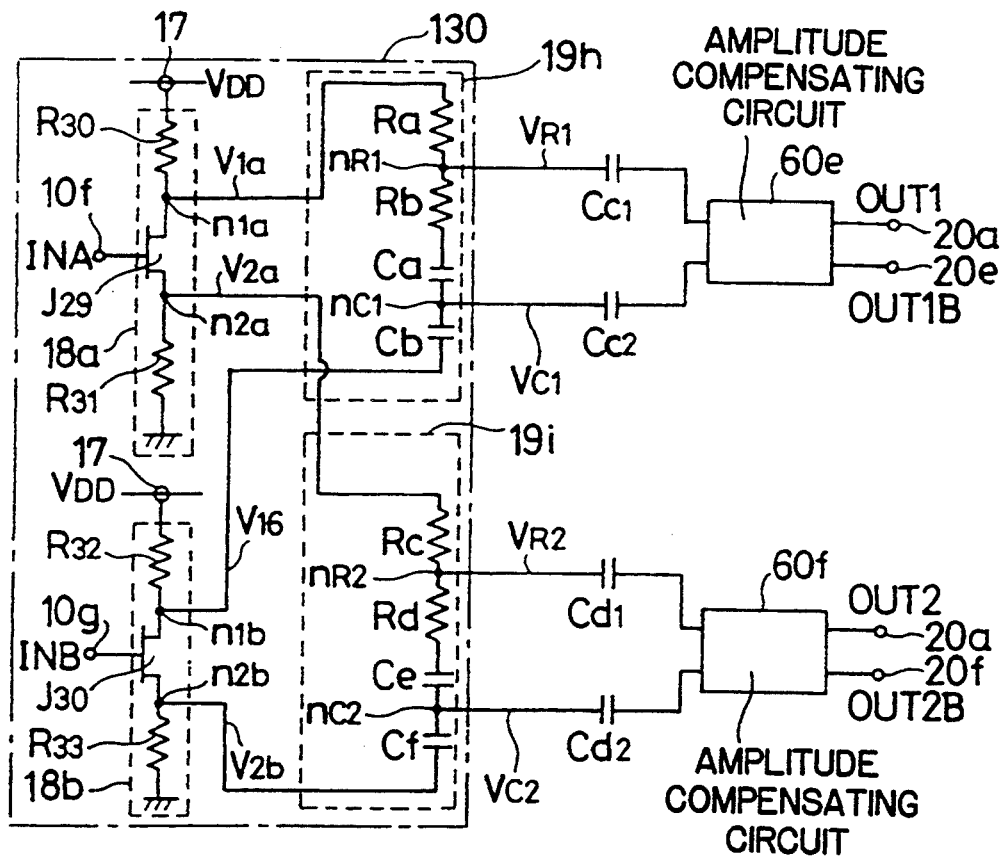
FIG. 13 is a circuit diagram illustrating a phase shifter section of the quadrature modulator in accordance with a seventh embodiment of the prevent invention.

FIG. 13 shows a circuit diagram illustrating a construction of the phase shifter section of the quadrature modulator according to a seventh embodiment of the present invention. In FIG. 13, the same reference numerals designate the same or corresponding elements as those in FIG. 7, and reference numeral 130 designates a 0°/90° phase shifter. The quadrature modulator of this seventh embodiment is obtained by replacing the 0°/90° phase shifter 60d of the phase shifter section 60 in the quadrature modulator of the third embodiment with a 0°/90° phase shifter 130.

The 0°/90° phase shifter 130 includes phase dividing circuits 18a, 18b which are connected to a positive phase signal input terminal (INA) 10f and a negative phase signal input terminal (INB) 10g, respectively, and signal separating circuits 19h, 19i which are connected to the phase dividing circuits 18a, 18b, respectively, and which separate and output the carrier signals having a 90° phase difference to amplitude compensating circuits.

In the phase dividing circuit 18a, reference characters R30, R31 designate resistors, reference character J29 designates a FET, and the gate of FET J29 is connected to the positive phase signal input terminal (INA) 10f, the drain thereof is connected to the power supply terminal $V_{DD}$ 17 via resistor R30, and the source thereof is grounded via resistor R31.

In the phase dividing circuit 18b, reference characters R32, R33 designate resistors, reference character J30 designates a FET, and the gate of FET J30 is connected to the negative phase signal input terminal (INB) 10g, the drain thereof is connected to the power supply terminal $V_{DD}$ 17 via resistor R32, and the source thereof is grounded via resistor R33.

In the signal separating circuit 19h, reference characters Ra, Rb designate resistors and reference characters Ca, Cb designate capacitors. The serial connection serially connecting the resistors Ra, Rb and the serial connection serially connecting the capacitors Ca, Cb, are serially connected between the connection node n1a of the drain of FET J20 and resistor R30 at the phase dividing separating circuit 18a, and the connection node n1b of the drain of FET J30 and resistor R32 at the phase dividing circuit 18b. The connection node nR1 of resistors Ra, Rb, serially connected, is connected to amplitude compensating circuit 60e via capacitor $C_{C1}$, and the connection node nC1 of capacitors Ca, Cb, serially connected, is connected to amplitude compensating circuit 60e via capacitor $C_{C2}$.

In the signal separating circuit 19i, reference characters Rc, Rd designate resistors and reference characters Ce, Cf designate capacitors. The serial connection serially connecting the resistors Rc, Rd and the serial connection serially connecting the capacitors Ce, Cf, are serially connected between the connection node n2a of the source of FET J29 and resistor R31 at the phase dividing circuit 18a, and the connection node n2b of the source of FET J30 and resistor R33 at the phase dividing circuit 18b. The connection node nR2 of resistors Rc, Rd, serially connected, is connected to amplitude compensating circuit 60f via capacitor Cd1, and the connection node nC2 of capacitors Ce, Cf, serially connected, is connected to amplitude compensating circuit 60f via capacitor Cd2.

The input carriers of reverse phases from each other which are input to the positive phase signal input terminal (INA) 10f and the negative phase signal input terminal (INB) 10g, are obtained by arranging differential amplifier circuits (not shown in the figure) as input stages.

In the figure, reference characters V1a, V2a, V1b, V2b, $V_{R1}$, $V_{C1}$, $V_{R2}$, $V_{C2}$ designate voltages at the connection nodes n1a, n2a, n1b, n2b, nR1, nC1, nR2, nC2, respectively.

Figure 14:
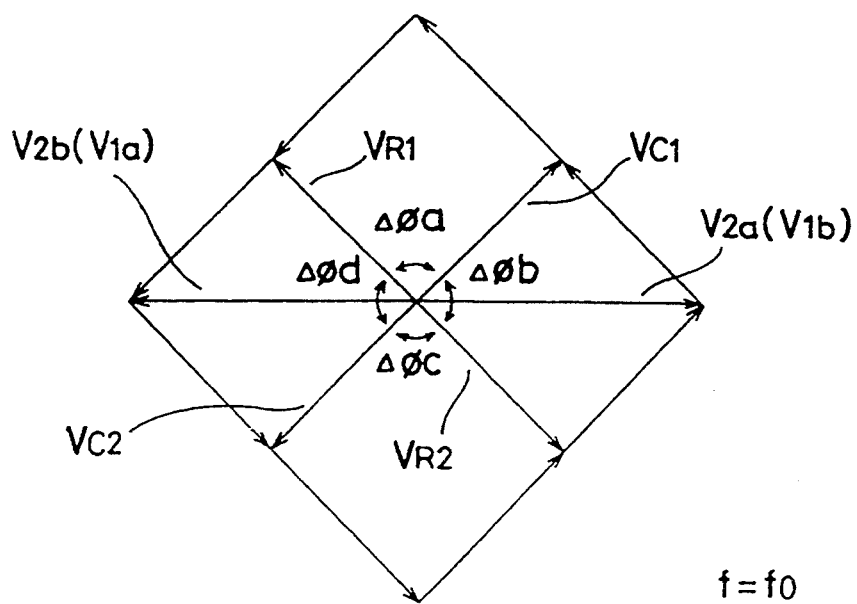
FIG. 14 is a vector diagram explaining the operation of the 0°/90° phase shifter shown in FIG. 13.

FIG. 14 is a diagram showing vectors V1a, V2a (=−V1a), V1b, V2b (=−V1b), $V_{R1}$, $V_{R2}$, $V_{C1}$, $V_{C2}$ at the target frequency (i.e., design frequency f=f$_0$) of the phase shifter in FIG. 13. In the figure, reference character $\Delta\phi a$ designates a phase difference between $V_{R1}$ and $V_{C1}$, reference $\Delta\phi b$ designates a phase difference between $V_{R2}$ and $V_{C1}$, reference character $\Delta\phi c$ represents a phase difference between $V_{R2}$ and $V_{C2}$, and reference character $\Delta\phi d$ represents a phase difference between $V_{C2}$ and $V_{R1}$.

The vector diagram of FIG. 14 shows that the phase shifter 130 has the same operation principle as the phase shifter 80 shown in FIG. 8, the amplitudes of $V_{R1}$, $V_{R2}$, $V_{C1}$, $V_{C2}$ are equal to each other at frequency f$_0$, and the respective phase differences $\Delta\phi a$, $\Delta\phi b$, $\Delta\phi c$, $\Delta\phi d$ all become 90°. Consequently, this phase shifter 130 also has advantages of maintaining orthogonality over a wide band as well as high precision as a function of element variations. In this phase shifter 130, however, the frequency characteristics of four output signals are not equal to each other at a frequency other than the designed center frequency, and the amplitude errors are larger at frequencies farther from the center frequency. In other words, this phase shifter 130 also has characteristics equivalent to that of a 0°/90° phase shifter employing a differentiating circuit and an integrating circuit, as the 0°/90° phase shifter shown in FIG. 8.

Thus, the quadrature modulator of this seventh embodiment is obtained by replacing the 0°/90° phase shifter 60d of the quadrature modulator of the second embodiment with the 0°/90° phase shifter 130 shown in FIG. 13, which has the same operation characteristics as the 0°/90° phase shifter 60d, and produces the same effects as the quadrature modulator of the second embodiment.

Embodiment 8

The quadrature modulator according to an eighth embodiment is obtained by replacing FETs J11 to J17 in the 0°/90° phase shifter 130 of the quadrature modulator of the seventh embodiment with bipolar transistors, replacing the amplifier circuits 200 of the amplitude compensating circuits 60e, 60f with the amplifier circuits 300 in FIG. 3, respectively, and replacing the amplifier circuits 400 of the amplitude compensating circuits 60e, 60f with the amplifier circuits 500 in FIG. 5, respectively.

The quadrature modulator of this eighth embodiment produces the same effects as the quadrature modulator of the fifth embodiment.

While in the above described embodiments, the 0°/90° phase shifters comprising resistors, capacitors, and transistors are employed, the present invention may be also applied to a quadrature modulator including a 0°/90° phase shifter comprising only resistors and capacitors.

As is evident from the foregoing description, according to the present invention, since the phase shifter comprises circuit elements appropriate for circuit integration and has a high degree of orthogonality as a function of variations in the characteristic values of the circuit elements, and further, amplitude compensating circuits converting the output carrier waves from the 0°/90° phase shifter to rectangular waveform signals each having a constant amplitude are provided, it is possible that complementary carriers having precise orthogonality as well as superior balance are input to double-balanced mixers. Accordingly, a superior modulation wave having fewer spurious components can be obtained easily as well as without adjustment. Further, the circuit integration of the quadrature modulator is simplified.

What is claimed is:

1. A quadrature modulator comprising:
   a 0°/90° phase shifter for separating an input carrier wave into two sinusoidal carrier signals having a 90° phase difference from each other, said 0°/90° phase shifter consisting of resistors, capacitors, and transistors and generating the two carrier signals by differentiation and integration, respectively;

two amplitude compensating circuits connected to said 0°/90° phase shifter, respectively converting the two sinusoidal carrier signals into rectangular signals having predetermined amplitudes; and two double-balanced mixers for respectively mixing base band signals with the respective rectangular signals produced by said two amplitude compensating circuits.

2. The quadrature modulator of claim 1 wherein said amplitude compensating circuits include a plurality of stages of amplifier circuits in cascade connection, each including a differential amplifier circuit and a source follower connected to said differential amplifier circuit.

3. The quadrature modulator of claim 2 wherein said amplifier circuit connected to said 0°/90° phase shifter has an impedance higher than the impedance of said 0°/90° phase shifter.

4. The quadrature modulator of claim 1 wherein said amplitude compensating circuits include transistors and said transistors of said 0°/90° phase shifter and of said amplitude compensating circuits are FETs.

5. The quadrature modulator of claim 2 wherein said amplitude compensating circuits include transistors and said transistors of said 0°/90° phase shifter and of said amplitude compensating circuits are FETs.

6. The quadrature modulator of claim 1 wherein said amplitude compensating circuits include transistors and said transistors of said 0°/90° phase shifter and of said amplitude compensating circuits are bipolar transistors.

7. The quadrature modulator of claim 2 wherein said amplitude compensating circuits include transistors and said transistors of said 0°/90° phase shifter and of said amplitude compensating circuits are bipolar transistors.

8. The quadrature modulator of claim 4 wherein said 0°/90° phase shifter includes a differentiating circuit and an integrating circuit, each of said differentiating and integrating circuits comprising resistors and capacitors.

9. The quadrature modulator of claim 5 wherein said 0°/90° phase shifter includes a differentiating circuit and an integrating circuit, each of said differentiating and integrating circuits comprising resistors and capacitors.

10. The quadrature modulator of claim 6 wherein said 0°/90° phase shifter includes a differentiating circuit and an integrating circuit, each of said differentiating and integrating circuits comprising resistors and capacitors.

11. The quadrature modulator of claim 7 wherein said 0°/90° phase shifter includes a differentiating circuit and an integrating circuit, each of said differentiating and integrating circuits comprising resistors and capacitors.

12. The quadrature modulator of claim 8 wherein said 0°/90° phase shifter includes two signal input terminals for receiving signals of reverse phases and said signal input terminals are connected to said differentiating circuit and said integrating circuit, respectively.

13. The quadrature modulator of claim 9 wherein said 0°/90° phase shifter includes two signal input terminals for receiving signals of reverse phases and said signal input terminals are connected to said differentiating circuit and said integrating circuit, respectively.

14. The quadrature modulator of claim 10 wherein said 0°/90° phase shifter includes two signal input terminals for receiving signals of reverse phases and said signal input terminals are connected to said differentiating circuit and said integrating circuit, respectively.

15. The quadrature modulator of claim 11 wherein said 0°/90° phase shifter includes two signal input terminals for receiving signals of reverse phases and said signal input terminals are connected to said differentiating circuit and said integrating circuit, respectively.

16. The quadrature modulator of claim 4 wherein said 0°/90° phase shifter comprises:

two signal input terminals for receiving signals of reverse phases; and a first serial connection of two resistors having the same resistances and a second serial connection of two capacitors having the same capacitances wherein the first and second serial connections are serially connected between said two signal input terminals and the connection nodes of said two resistors and said two capacitors are output terminals.

17. The quadrature modulator of claim 5 wherein said 0°/90° phase shifter comprises:

two signal input terminals for receiving signals of reverse phases; and a first serial connection of two resistors having the same resistances and a second serial connection of two capacitors having the same capacitances wherein the first and second serial connections are serially connected between said two signal input terminals and the connection nodes of said two resistors and said two capacitors are output terminals.

18. The quadrature modulator of claim 6 wherein said 0°/90° phase shifter comprises:

two signal input terminals for receiving signals of reverse phases; and a first serial connection of two resistors having the same resistances and a second serial connection of two capacitors having the same capacitances wherein the first and second serial connections are serially connected between said two signal input terminals and the connection nodes of said two resistors and said two capacitors are output terminals.

19. The quadrature modulator of claim 7 wherein said 0°/90° phase shifter comprises:

two signal input terminals for receiving signals of reverse phases; and a first serial connection of two resistors having the same resistances and a second serial connection of two capacitors having the same capacitances wherein the first and second serial connections are serially connected between said two signal input terminals and the connection nodes of said two resistors and said two capacitors are output terminals.

20. The quadrature modulator of claim 4 wherein said 0°/90° phase shifter comprises:

first and second signal input terminals for receiving signals of reverse phases;

first and second resistors having the same resistances and third and fourth resistors having the same resistances;

a first FET including a gate connected to said first signal input terminal, a drain connected to a power supply via said first resistor, and a source grounded via said second resistor;

a second FET including a gate connected to said second signal input terminal, a drain connected to a power supply via said third resistor, and a source grounded via said fourth resistor;

a first serial connection of a fifth resistor and a sixth resistor, said fifth and sixth resistors having the same resistances, and a second serial connection of a first capacitor and a second capacitor, said first and second capacitors having the same capacitances, said first and second serial connections being serially connected between a connection node of said drain of said first FET and said first resistor and a connection node of said drain of said second FET and said third resistor; and a third serial connection of a seventh resistor and an eighth resistor, said seventh and eighth resistors having the same resistances, and a fourth serial connection of a third capacitor and a fourth capacitor, said third and fourth capacitors having the same capacitances, said third and fourth serial connections being serially connected between a connection node of said source of said first FET and said second resistor and a connection node of said source of said second FET and said fourth resistor, a connection node of said fifth and sixth resistors, a connection node of said first and second capacitors, a connection node of said seventh and eighth resistors, and a connection node of said third and fourth capacitors being respective output terminals.

21. The quadrature modulator of claim 5 wherein said 0°/90° phase shifter comprises:

first and second signal input terminals for receiving signals of reverse phases;

first and second resistors having the same resistances and third and fourth resistors having the same resistances;

a first FET including a gate connected to said first signal input terminal, a drain connected to a power supply via the first resistor, and a source grounded via said second resistor;

a second FET including a gate connected to said second signal input terminal, a drain connected to a power supply via said third resistor, and a source grounded via said fourth resistor;

a first serial connection of a fifth resistor and a sixth resistor, the fifth and sixth resistors having the same resistances, and a second serial connection of a first capacitor and a second capacitor, said first and second capacitors having the same capacitances, said first and second serial connections being serially connected between a connection node of said drain of said first FET and said first resistor and a connection node of said drain of said second FET and said third resistor; and a third serial connection of a seventh resistor and an eighth resistor, said seventh and eighth resistors having the same resistances, and a fourth serial connection of a third capacitor and a fourth capacitor, said third and fourth capacitors having the same capacitances, said third and fourth serial connections being serially connected between a connection node of said source of said first FET and said second resistor and a connection node of said source of said second FET and said fourth resistor, a connection node of said fifth and sixth resistors, a connection node of said first and second capacitors, a connection node of said seventh and eighth resistors, and a connection node of said third and fourth capacitors being respective output terminal.

22. The quadrature modulator of claim 6 wherein said 0°/90° phase shifter comprises:

first and second signal input terminals for receiving signals of reverse phases;

first and second resistors having the same resistances and third and fourth resistors having the same resistances;

a first bipolar transistor including a base connected to said first signal input terminal, a collector connected to a power supply via the first resistor, and an emitter grounded via said second resistor;

a second bipolar transistor including a base connected to said second signal input terminal, a collector connected to a power supply via said third resistor, and an emitter grounded via said fourth resistor;

a first serial connection of a fifth resistor and a sixth resistor, said fifth and sixth resistors having the same resistances, and a second serial connection of a first capacitor and a second capacitor, said first and second capacitors having the same capacitances, said first and second serial connections being serially connected between a connection node of said collector of said first bipolar transistor and said first resistor and a connection node of said collector of said second bipolar transistor and said third resistor; and a third serial connection of a seventh resistor and an eighth resistor, said seventh and eighth resistors having the same resistances, and a fourth serial connection of a third capacitor and a fourth capacitor, said third and fourth capacitors having the same capacitances, said third and fourth serial connections being serially connected between a connection node of said emitter of said first bipolar transistor and said second resistor and a connection node of said emitter of said second bipolar transistor and said fourth resistor, a connection node of said fifth and sixth resistors, a connection node of said first and second capacitors, a connection node of said seventh and eighth resistors, and a connection node of said third and fourth capacitors being respective output terminals.

23. The quadrature modulator of claim 7 wherein said 0°/90° phase shifter comprises:

first and second signal input terminals for receiving signals of reverse phases;

first and second resistors having the same resistances and third and fourth resistors having the same resistances;

a first bipolar transistor including a base connected to said first signal input terminal, a collector connected to a power supply via the first resistor, and an emitter grounded via said second resistor;

a second bipolar transistor including a base connected to said second signal input terminal, a collector connected to a power supply via said third resistor, and an emitter grounded via said fourth resistor;

a first serial connection of a fifth resistor and a sixth resistor, said fifth and sixth resistors having the same resistances, and a second serial connection of a first capacitor and a second capacitor, said first and second capacitors having the same capacitances, said first and second serial connections being serially connected between a connection node of said collector of said first bipolar transistor and said first resistor and a connection node of said collector of said second bipolar transistor and said third resistor; and a third serial connection of a seventh resistor and an eighth resistor, said seventh and eighth resistors having the same resistances, and a fourth serial connection of a third capacitor and a fourth capacitor, said third and fourth capacitors having the same capacitances, said third and fourth serial connections being serially connected between a connection node of said emitter of said first bipolar transistor and said second resistor and a connection node of said emitter of said second bipolar transistor and said fourth resistor, a connection node of said fifth and sixth resistors, a connection node of said first and second capacitors, a connection node of said seventh and eighth resistors, and a connection node of said third and fourth capacitors being respective output terminals.

24. A quadrature modulator comprising:

a 0°/90° phase shifter for separating an input carrier wave into two sinusoidal carrier signals having a 90° phase difference from each other, said 0°/90° phase shifter consisting of resistors and capacitors and generating the two carrier signals by differentiation and integration, respectively;

two amplitude compensating circuits connected to said 0°/90° phase shifter, respectively converting the two sinusoidal carrier signals into rectangular signals having predetermined amplitudes: and two double-balanced mixers for respectively mixing base band signals with the respective rectangular signals produced by said two amplitude compensating circuits.

* * * * *